(12) United States Patent
Sato et al.

(10) Patent No.: US 10,467,053 B2
(45) Date of Patent: *Nov. 5, 2019

(54) MULTI-THREAD PROCESSOR WITH RESCHEDULING WHEN THREADS ARE NONDISPATCHABLE

(71) Applicant: Renesas Electronics Corporation, Tokyo (JP)

(72) Inventors: Junichi Sato, Tokyo (JP); Koji Adachi, Tokyo (JP); Yousuke Nakamura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,255

(22) Filed: Nov. 7, 2017

(65) Prior Publication Data

US 2018/0067766 A1 Mar. 8, 2018

Related U.S. Application Data

(63) Continuation of application No. 15/393,368, filed on Dec. 29, 2016, now Pat. No. 9,841,996, which is a continuation of application No. 14/054,418, filed on Oct. 15, 2013, now Pat. No. 9,569,261.

(30) Foreign Application Priority Data

Oct. 17, 2012 (JP) .................. 2012-230234

(51) Int. Cl.
*G06F 9/48* (2006.01)
*G06F 9/38* (2018.01)
*G06F 9/46* (2006.01)

(52) U.S. Cl.
CPC .......... *G06F 9/4881* (2013.01); *G06F 9/3836* (2013.01); *G06F 9/4887* (2013.01); *Y02D 10/24* (2018.01)

(58) Field of Classification Search
None
See application file for complete search history.

(56) References Cited

U.S. PATENT DOCUMENTS

| | | | |
|---|---|---|---|
| 5,745,778 A | * | 4/1998 | Alfieri ................... G06F 9/4881 711/133 |
| 2005/0198475 A1 | | 9/2005 | Arnold et al. |
| 2010/0082945 A1 | | 4/2010 | Adachi et al. |
| 2010/0083267 A1 | | 4/2010 | Adachi et al. |
| 2010/0106356 A1 | | 4/2010 | Trepagnier |

(Continued)

FOREIGN PATENT DOCUMENTS

JP 2010-86128 A 4/2010

OTHER PUBLICATIONS

European Search Report dated Feb. 26, 2016.
(Continued)

*Primary Examiner* — Eric C Wai
(74) *Attorney, Agent, or Firm* — McGinn IP Law Group, PLLC

(57) ABSTRACT

A multi-thread processor includes a plurality of hardware threads that generates a plurality of mutually independent instruction streams, respectively and a scheduler that schedules the plurality of hardware threads.

6 Claims, 14 Drawing Sheets

(56) References Cited

U.S. PATENT DOCUMENTS

2010/0211954 A1    8/2010   Bauer
2010/0299671 A1   11/2010   Kinsey

OTHER PUBLICATIONS

Jorg Mische, et al., "IPC Control for Multiple Real-Time Threads on an In-Order SMT Processor", Jan. 25, 2009, Fourth International Conference on High-Performance Embedded Architectures and Compilers, Jan. 25-28, 2009, pp. 125-139.
Japanese Office Action dated Jun. 28, 2016 with an English translation.
European Search Report dated Feb. 10, 2017.
Chinese Office Action dated Sep. 20, 2017, with an English translation.

* cited by examiner

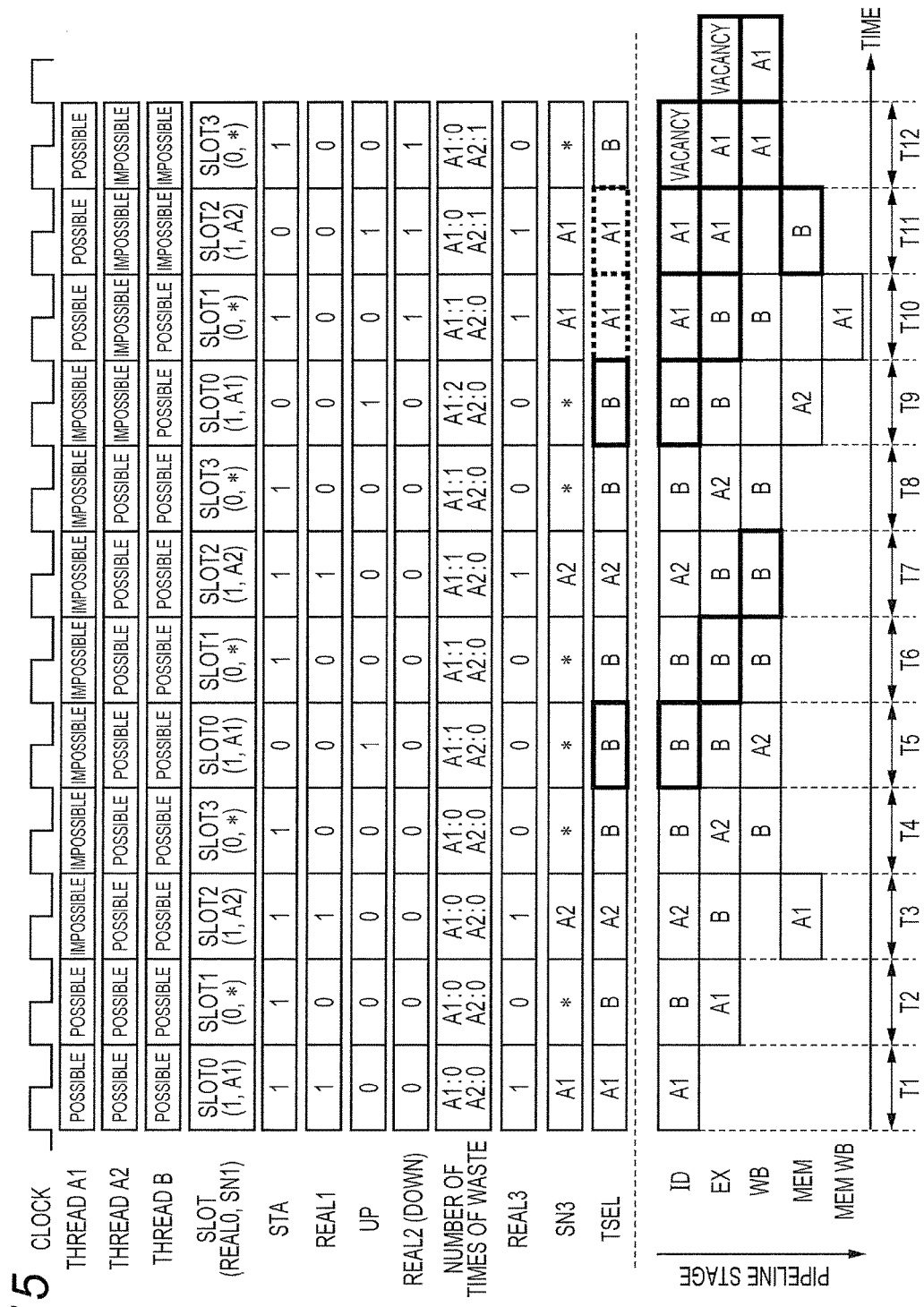

MULTI-THREAD PROCESSOR WITH RESCHEDULING WHEN THREADS ARE NONDISPATCHABLE

REFERENCE TO RELATED APPLICATION

This Application is a Continuation Application of U.S. patent application Ser. No. 15/393,368, filed on Dec. 29, 2016, which is a Continuation Application of U.S. patent application Ser. No. 14/054,418 (Now U.S. Pat. No. 9,569, 261 B2).

CROSS-REFERENCE TO RELATED APPLICATIONS

The disclosure of Japanese Patent Application No. 2012-230234 filed on Oct. 17, 2012 including the specification, drawings and abstract is incorporated herein by reference in its entirety.

BACKGROUND

The present invention relates to a technology of scheduling multiple hardware threads, for example, in a multi-thread processor having the multiple hardware threads.

A hardware multi-thread technology for enhancing a throughput of a processor has been proposed. A processor that supports hardware multi-threads (hereinafter called a multi-thread processor) has multiple hardware threads that generate mutually independent instruction streams, respectively, and performs an arithmetic processing while switching an arithmetic operation circuit for executing an instruction with a pipeline to process an instruction stream generated by a hardware thread.

In the multi-thread processor, scheduling of the multiple hardware threads is required. As a technique of the scheduling, the round robin system and the priority system are known. In the round robin system, the hardware threads put in a queue are selected in turn for every fixed time and are executed. Therefore, in the round robin system, a thread in the queue is assigned fairly to a CPU for every fixed time, and is executed. Moreover, the priority system performs a hardware thread in order of the priority of the hardware thread. Specifically, in the priority system, a hardware thread of each priority is queued to a queue provided for each priority, and the hardware thread is selected sequentially from the queue of a high priority and is assigned to the CPU to be executed.

However, as a problem common to the round robin system and the priority system, there is a problem that it is impossible to set an execution time of the hardware thread flexibly while ensuring a minimum execution time of the hardware thread. For example, in the round robin system, when there are many hardware threads, there is a problem that the execution time of each thread decreases equally and a sufficient execution time cannot be assigned to a high priority hardware thread. Moreover, in the priority system, there is a problem that when processings of the high priority hardware threads continue, a low priority hardware thread cannot be processed.

A technique for addressing this problem is disclosed in Japanese Unexamined Patent Application Publication No. 2010-86128. This technique divides one circulation period of scheduling into a first execution period and a second execution period, specifies execution of one or more hardware threads that are selected fixedly among multiple hardware threads of the multi-thread processor in the first execution period, and specifies execution of an arbitrary hardware thread in the second execution period. The scheduler in the multi-thread processor performs the scheduling by repeating such a circulation period.

To the multi-thread processor to which the technique is applied, for example, in the first execution period, a hardware thread whose minimum execution time is intended to be secured is defined, and in the second execution period, an arbitrary hardware thread is defined according to a processing situation at that time. By doing this, the hardware thread to be executed in the first execution period is executed irrespective of the priorities of other hardware threads. Moreover, an arbitrary hardware thread can be executed in the second execution period.

SUMMARY

In fields, such as of automotive control, it is necessary to perform scheduling so that a ratio of an execution time of some hardware threads (hereinafter called a "first group") among multiple hardware threads and an execution time of other hardware threads (hereinafter called a "second group") may be constant and a ratio of the execution time between the hardware threads included in the above-mentioned first group may be constant.

For example, suppose that there are five hardware threads of A1, A2, B1, B2, and B3, A1 and A2 belong to a group A, and B1, B2, and B3 belong to a group B. Moreover, a case where the scheduling is performed so that a ratio of the execution times of the group A and the group B may be "1:1" and a ratio of the execution times between respective hardware threads (A1, A2) in the group A may become "1:1" is considered. That is, a ratio of the execution time of A1, the execution time of A2, and a time when any one of the group B (B1, B2, and B3) is executed is "1:1:2."

In order to realize such scheduling, application of the technique disclosed in Japanese Unexamined Patent Application Publication No. 2010-86128 is conceivable. For example, A1 and A2 are defined to a first execution period, and B1, B2, and B3 are defined to a second execution period. As a result, a schedule that makes "specification of A1, specification of A2, and specification of any one of the hardware threads of group B" be performed is repeated, so that execution of the hardware threads is performed at a ratio as designed by a designer.

However, the hardware thread is not necessarily always in a dispatchable state because of various hazards, such as waiting of I/O read (hereinafter simply called "I/O waiting") whose speed is lower than that of a CPU. On the other hand, by the technique described above, the hardware thread defined in the first execution period is certainly specified in the first execution period. Therefore, there is a possibility that the hardware defined in a first execution time will be specified when it is nondispatchable. For example, A1 may be specified when A1 is nondispatchable.

This situation causes a problem that a step in which nothing is processed occurs over a pipeline and a processing efficiency of the CPU will fall. Incidentally, one step over the pipeline is also called one execution slot, and a situation in which a step of processing nothing over the pipeline occurs is hereinafter also called vacancy arising in the execution slot.

Moreover, there is also a problem that it becomes impossible to perform these hardware threads at a ratio as designed because of accumulation of such things.

Other problems and new features will become clear from description and accompanying drawings of this specification.

According to one embodiment, the multi-thread processor has multiple hardware threads that generate mutually independent instruction streams, respectively, and a scheduler for specifying a hardware thread that is to be executed next among the multiple hardware threads.

The scheduler performs thread scheduling and rescheduling. In the thread scheduling, the scheduler repeats processings of specifying each hardware thread included in the first group among the multiple hardware threads by the number of times set up in advance for the hardware thread and of specifying any one of the hardware threads in the second group by the number of times set up in advance for the second group that includes other hardware threads.

The scheduler performs the rescheduling when the hardware thread in the first group specified by the thread scheduling is nondispatchable. This rescheduling is a processing of specifying the hardware thread in the second group instead of the above-mentioned hardware thread that is execution nondispatchable.

Incidentally, what is represented by replacing the apparatus according to the above-mentioned embodiment with a method, a system, or the like is also effective as a mode of the present invention.

According to the one embodiment, it is possible to execute the multiple hardware threads in the multi-thread processor at a ratio as designed and to prevent performance decrement of the multi-thread processor.

BRIEF DESCRIPTION OF THE DRAWINGS

FIG. 15 is a diagram showing one example of the scheduling by the scheduler of the fourth embodiment.

DETAILED DESCRIPTION

Figure 1:
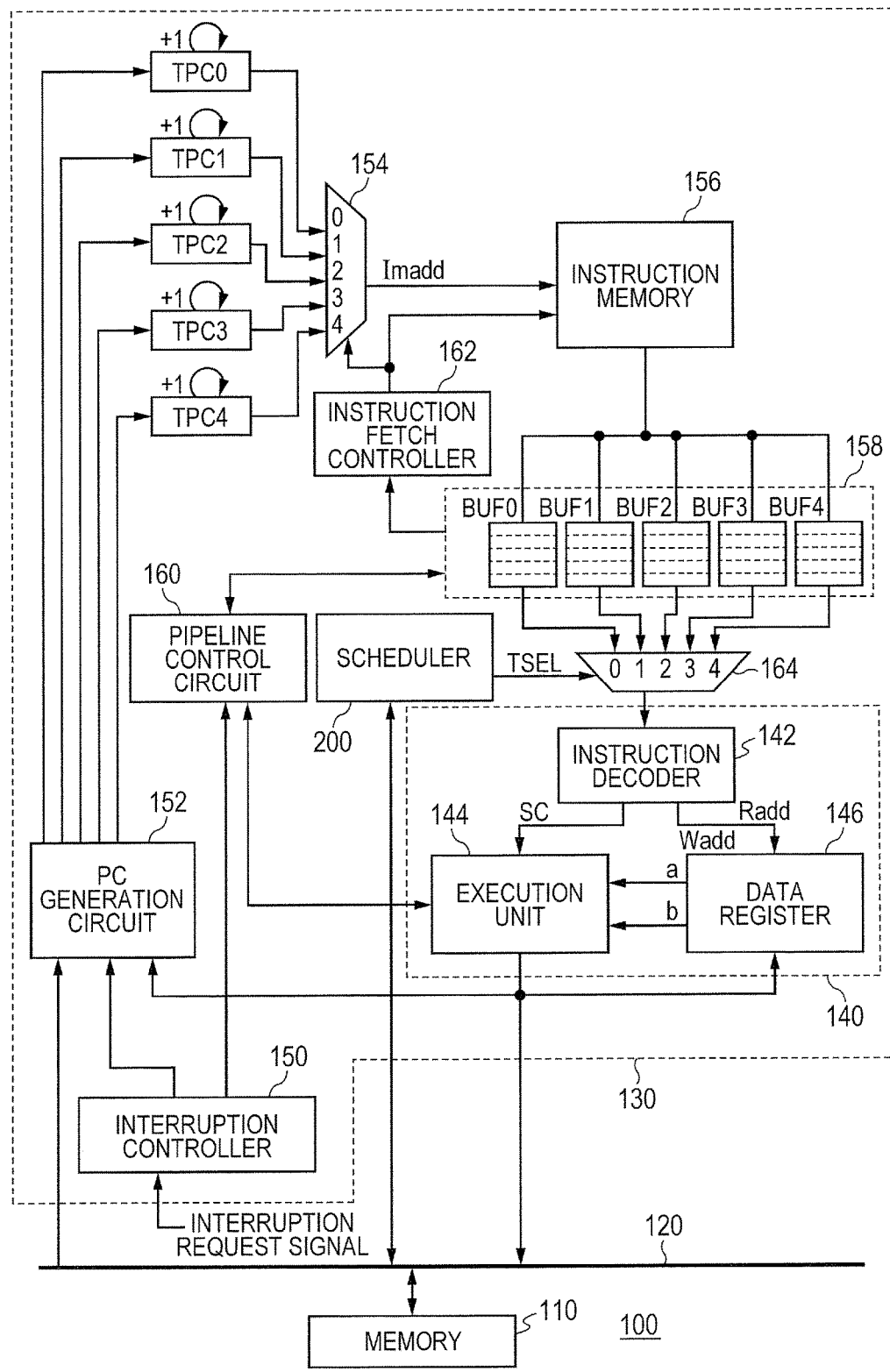
FIG. 1 is a diagram showing a processor system according to a first embodiment.

For clarification of explanation, the following description and drawings are subjected to abbreviation and simplification suitably. Moreover, each component described in the drawing as a functional block for performing various processings can be configured with a CPU, memory, and other circuits in terms of hardware and is realized by a program loaded into the memory in terms of software. Therefore, the person skilled in the art recognizes that these functional blocks can be realized in various forms with only hardware, only software, or a combination thereof, and are not limited to any one of them, unless there is a special explanation. Incidentally, in each drawing, the same symbol is given to the same component and a duplicated explanation is omitted as necessary.

Moreover, the program described above can be stored using non-transitory computer readable media of various types, and can be supplied to a computer. The non-transitory computer readable media include a tangible storage media of various types. Examples of the non-transitory computer readable medium include magnetic recording media (for example, a flexible disk, magnetic tape, a hard disk drive), optical magnetic recording media (for example, a magneto-optical disk), a CD-ROM (Read Only Memory), a CD-R, a CD-R/W, and semiconductor memories (for example, a mask ROM, a PROM (Programmable ROM), an EPROM (Erasable PROM), a flash ROM, a RAM (Random Access Memory)). Moreover, the program may be supplied to the computer by a transitory computer readable medium of a various type. Examples of the transitory computer readable medium include an electric signal, a light signal, and electromagnetic wave. The transitory computer readable medium can supply a program to the computer through a wired communication path of electric wire, optical fiber, etc. or a radio communication path.

First Embodiment

FIG. 1 is a diagram showing a processor system 100 according to a first embodiment. The processor system 100 has memory 110 and a multi-thread processor 130 that are coupled through a system bus 120. Incidentally, although not illustrated, other circuits, such as an input/output interface, are coupled to the system bus 120.

The multi-thread processor 130 has multiple hardware threads. The hardware thread is a system for generating the instruction stream that includes a series of instruction groups read from the instruction memory according to the instruction fetch address outputted by a thread program counter built in the multi-thread processor 130, and includes circuit groups, such as a thread program counter, instruction memory, a general-purpose register, and a control register (in this embodiment, this shall be built in a pipeline control circuit 160). In this embodiment, the multi-thread processor 130 has multiple thread program counters, and the hardware threads whose number is the same as the number of the thread program counters are implemented.

As illustrated in the drawing, the multi-thread processor 130 has an arithmetic operation circuit 140, an interruption controller 150, a PC generation circuit 152, thread program counters TPC0 to TPC4, a selector 154, instruction memory 156, an instruction buffer 158, the pipeline control circuit 160, an instruction fetch controller 162, a selector 164, and a scheduler 200.

The arithmetic operation circuit 140 performs a data processing based on an instruction that the hardware thread selected by the selector 164 generates. More specifically, the arithmetic operation circuit 140 has an instruction decoder 142, an execution unit 144, and a data register 146.

The instruction decoder 142 decodes a received instruction and outputs an arithmetic operation control signal SC to the execution unit 144. Moreover, the instruction decoder 142 outputs data register address Radd and data register address Wadd that indicate storage positions of data based on a decode result of the instruction.

The execution unit 144 performs various kinds of operations in response to the arithmetic operation control signal SC. Incidentally, the execution unit 144 has multiple execution stages, and performs the arithmetic operation by a pipeline processing. Moreover, the operation result performed in the execution unit 144 is transmitted to the PC generation circuit 152, the memory 110, and the data register 146 according to the kind of the operation result.

The data register 146 stores the data to be used in the execution unit 144 and outputs data of an address specified by the data register address Radd. In the example shown in FIG. 1, the data register 146 outputs data a and data b according to the data register address Radd. Moreover, the data register 146 stores the operation result that the execution unit 144 outputs at an address specified by the data register address Wadd.

The interruption controller 150 outputs an interruption indication signal that directs execution of an interrupt processing into the multi-thread processor 130 in response to an interruption request signal. More specifically, when the interruption request signal is received, the interruption controller 150 determines an interruption factor, a priority of the interrupt processing, etc., and directs execution of the interrupt processing to the PC generation circuit 152 and the pipeline control circuit 160 so that they may perform processings relevant to that interruption factor. This interruption request is outputted from circuits other than the multi-thread processor 130 in addition to what the multi-thread processor 130 outputs.

The PC generation circuit 152 generates an update value of the program counter (hereinafter called a "program count update value"). It receives a new program instruction signal that is inputted through the system bus 120, an interruption indication signal outputted by the interruption controller 150, and a branching indication signal outputted based on a processing in the execution unit 144, and generates the program count update value. The PC generation circuit 152 gives the generated program count update value to any one of the thread program counters TPC0 to TPC4. Incidentally, the PC generation circuit 152 also has a function of judging to which thread program counter the generated program count update value should be given.

The thread program counters TPC0 to TPC4 generate addresses (each being called an "instruction fetch address IMadd") of the instruction memory 156 in which instructions to be processed are stored, respectively. Specifically, when the program count update values are given from the PC generation circuit 152, the thread program counters TPC0 to TPC4 update the instruction fetch address IMadd according to the program count update values. On the other hand, when there are no inputs of the program count update values, the thread program counters TPC0 to TPC4 calculate addresses in ascending order and find a continuous next instruction fetch address IMadd.

Incidentally, as an example, in FIG. 1, the number of the thread program counters is assumed to be five (TPC0 to TPC4), and the number of the hardware threads in the multi-thread processor 130 is also set to five. The numbers of the thread program counters and of the hardware threads are not limited to five.

The selector 154 selects any one of the thread program counters TPC0 to TPC4 according to a thread specification signal outputted by the instruction fetch controller 162 and outputs the instruction fetch address IMadd outputted by the selected program counter. Incidentally, in FIG. 1, the numbers 0 to 4 given to input terminals of the selector 154 represent hardware thread numbers, respectively.

Incidentally, it is assumed that hardware threads A1, A2, and B1 to B3 are given numbers 0, 1, 2, 3, and 4, respectively.

The instruction memory 156 is a memory area that is shared by all the hardware threads (in this embodiment, five) of the multi-thread processor 130, and various instructions used in arithmetic operations performed in the multi-thread processor 130 are stored therein.

The thread specification signal that the instruction fetch controller 162 outputs is also inputted into the instruction memory 156. The instruction memory 156 assigns an output destination of an instruction specified by the instruction fetch address IMadd inputted through the selector 154 according to the thread specification signal that the instruction fetch controller 162 outputs.

In this embodiment, the instruction buffer 158 has instruction buffer areas BUF0 to BUF4 corresponding to the thread program counters TPC0 to TPC4. The instruction memory 156 outputs an instruction to an area corresponding to the thread specification signal that the instruction fetch controller 162 outputs among the instruction buffer areas BUF0 to BUF4. Incidentally, the instruction memory 156 may be a predetermined memory area contained in the memory 110.

The instruction buffer areas BUF0 to BUF4 are buffer circuits in FIFO (First In First Out) format. Moreover, the instruction buffer areas BUF0 to BUF4 may be ones each of which is a divided portion of an area in a single buffer, or may be formed in different buffers, respectively.

The pipeline control circuit 160 monitors an instruction stored in the head of the instruction buffer 158 and an instruction currently executed in the execution unit 144. Then, when an interruption directive signal is inputted into the pipeline control circuit 160 from the interruption controller 150, it gives a directive of discarding an instruction belonging to a hardware thread related to the interruption processing to the instruction buffer 158 and the execution unit 144.

The instruction fetch controller 162 judges an instruction belonging to any hardware thread should be fetched depending on the number of instructions stored in the instruction buffer 158, and outputs the thread specification signal to the selector 154 based on its judgment result. For example, when the number of instruction queues stored in the instruction buffer area BUF0 is smaller than the number of the instruction queues stored in other instruction buffer areas, the instruction fetch controller 162 judges that an instruction belonging to the hardware thread of No. 0 should be fetched and outputs the thread specification signal indicating the hardware thread of No. 0. Thereby, the selector 154 selects the thread program counter TPC0. Incidentally, the instruction fetch controller 162 may decide the hardware thread to be selected by a procedure using any system known conventionally, such as the round robin system.

The selector 164 selects any one of the instruction buffer areas BUF0 to BUF4 according to a thread selection signal TSEL that the scheduler 200 outputs and outputs the instruction read from the selected instruction buffer area to the arithmetic operation circuit 140. That is, the selector 164 selects one hardware thread from among the multiple hardware threads according to the thread selection signal TSEL and outputs the instruction that the selected hardware thread outputs to the arithmetic operation circuit 140. Incidentally, the numbers 0 to 4 given to input terminals of the selector 164 represent the hardware thread numbers, respectively.

The scheduler 200 outputs the thread selection signal TSEL for specifying one hardware thread to be executed in the next execution cycle among five hardware threads based on the schedule set up in advance. In the multi-thread processor 130, this schedule is designed by a user of the multi-thread processor 130, i.e., a designer of a program that operates over the multi-thread processor 130, and is set up, for example, by a management program that is executed immediately after starting of the multi-thread processor 130.

For ease of explanation below, five hardware threads (number: 0 to 4) in the multi-thread processor 130 are designated as A1, A2, B1, B2, and B3, respectively. A1 and A2 are real time threads, for example, and form a first group. B1 to B3 are threads other than the real time thread (non-real time threads), and form a second group.

Incidentally, in the following explanation and each drawing, a notation such that A or B is followed by a number, such as "A1" and "B2," represents a relevant hardware thread, and a notation followed by no number, such as "A" and "B," represents any one hardware thread in a relevant group. For example, "A1" and "B2" represent a hardware thread A1 and a hardware thread B2, respectively, and "A" and "B" represent any one hardware thread in the first group (the hardware thread A1 or a hardware thread A2) and any one hardware thread in the second group (a hardware thread B1 or the hardware thread B2), respectively.

The above-mentioned schedule is set up so that a ratio of an execution time of A1, an execution time of A2, and an execution time of B may become fixed. As an example, assume that this ratio set to "1:1:2."

The scheduling that the scheduler 200 performs in this embodiment includes thread scheduling and rescheduling. Here, the thread scheduling and the rescheduling will be explained concretely.

Thread Scheduling

The thread scheduling is scheduling of repeatedly executing the schedule set up in advance. In the thread scheduling, the scheduler 200 specifies the hardware threads so that "specification of A1" may be done once, "specification of A2" may be done once, and "specification of B (any one of B1, B2, and B3) may be done twice.

Rescheduling

The rescheduling is performed when although A (A1 or A2) is specified as a hardware thread to be executed next by the above-mentioned thread scheduling, the specified hardware thread is nondispatchable. A factor that makes the hardware thread nondispatchable includes, for example, I/O waiting and the like.

In the rescheduling, the scheduler 200 respecifies any one of the hardware threads (the hardware thread B) in the second group instead of the hardware thread A specified by the thread scheduling.

That is, the scheduler 200 performs scheduling (the thread scheduling) of repeating in principle a schedule set up in advance. Then, when although the hardware thread A is specified by the thread scheduling, the hardware thread A is nondispatchable, the scheduler 200 specifies a hardware thread B instead of the hardware thread A. Therefore, even when the hardware thread A specified by the thread scheduling is nondispatchable, occurrence of vacancy in an execution slot can be avoided.

That is, the scheduler 200 realizes best efforts in both securement of the execution time of each thread by scheduling according to a schedule set up in advance and avoidance of performance decrement of the multi-thread processor 130.

Here, it should be noted that when in rescheduling, the hardware thread specified instead of the hardware thread A (for example, A1) is not the other hardware thread A (for example, A2) but the hardware thread B.

The ratio that the designer of the multi-thread processor 130 wishes to realize about the numbers of times of execution of the hardware threads A1, A2, and B is "1:1:2." That is, in four times of execution, A1 is specified once, A2 is specified once, and B is specified twice.

In the case where when the hardware thread A1 specified by the thread scheduling is nondispatchable, the hardware thread A2 is respecified instead of the hardware thread A1, A1 will be specified zero time, A2 will be specified twice, and B will be specified twice in the circulation period. Now, in this case, the ratio of excursion of the hardware thread A2 will change.

On the other hand, according to the scheduler 200 in this embodiment, when the hardware thread A1 specified by the thread scheduling is nondispatchable, since the hardware thread B is respecified instead of the hardware thread A1, A1 will be specified zero time, A2 will be specified once, and B will be specified three times.

The hardware thread A1 and the hardware thread A2 included in the first group are hardware threads whose ratios of execution are intended to be ensured more than every hardware thread of the second group. Incidentally, that "the ratio of execution is ensured" includes not only "not reducing the execution time" but also "not increasing the execution time unduly." Therefore, the scheduler 200 for when the hardware thread A1 specified by the thread scheduling is nondispatchable, respecifying the hardware thread B instead of the hardware thread A1 can execute the hardware thread whose ratio of execution is intended to be specially ensured at a ratio nearer to the execution ratio of the hardware thread that the designer intentionally designed at first.

Figure 2:
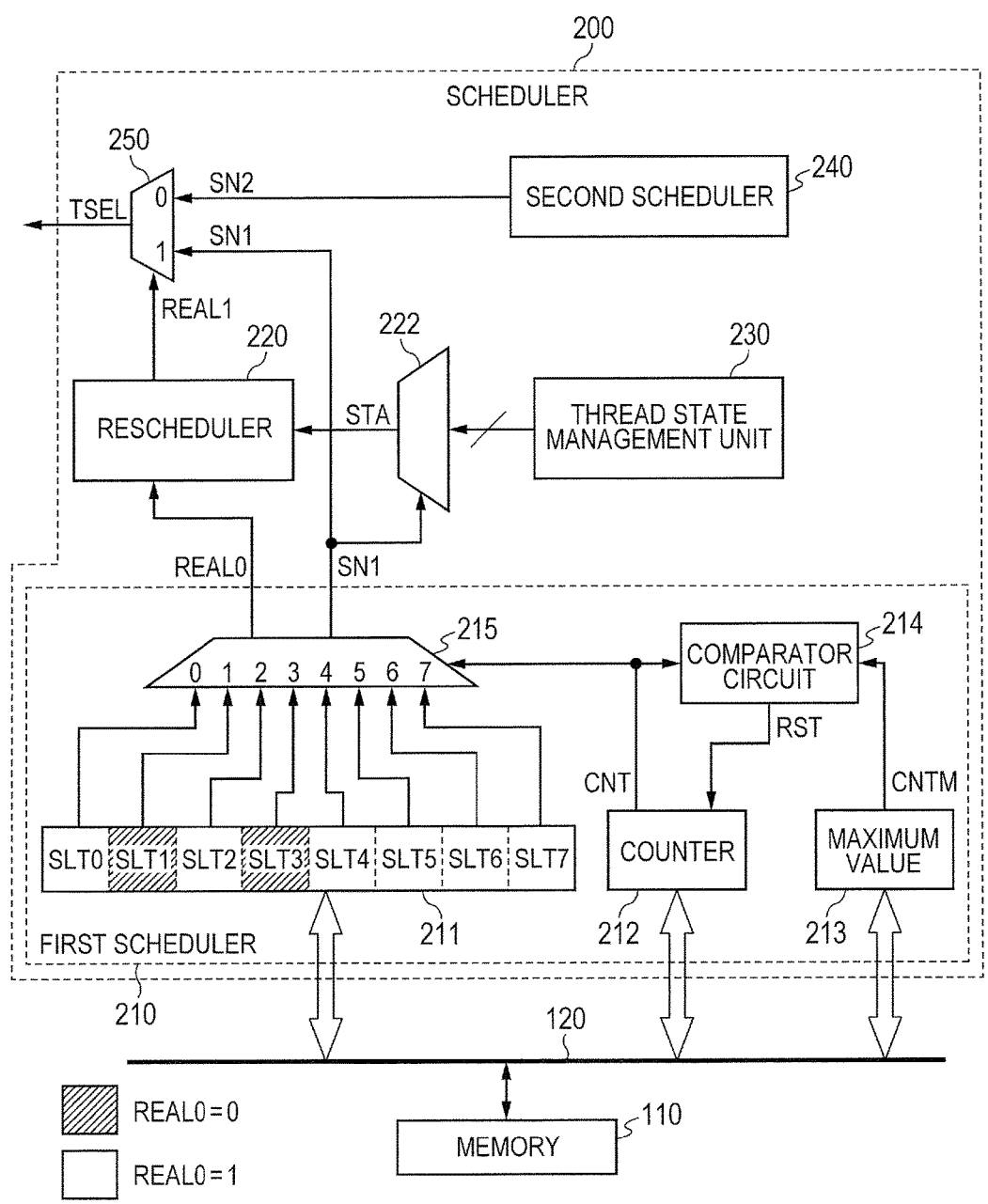
FIG. 2 is a diagram showing one example of a circuit configuration of a scheduler of a multi-thread processor in the processor system shown in FIG. 1.

With reference to FIG. 2, one example of a specific circuit configuration of the scheduler 200 will be explained. In the example shown in FIG. 2, the scheduler 200 has a first scheduler 210, a rescheduler 220, a selector 222, a thread state management unit 230, a second scheduler 240, and a selector 250. The first scheduler 210, the second scheduler 240, and the selector 250 bear the thread scheduling described above, and the rescheduler 220 and the thread state management unit 230 bear the rescheduling described above.

The first scheduler 210 outputs a selection signal REAL0 for switching the first group and the second group and outputs the hardware thread number. Below, the number that the first scheduler 210 outputs is called a "first number SN1."

As described above, as an example, each hardware thread in the first group is a real time thread, and each hardware thread in the second group is a non-real time thread. Therefore, the selection signal REAL0 is also called a "real time bit signal" below. Moreover, the real time bit signal REAL0 represents the first group and the second group by "1" and "0," respectively.

As illustrated in the drawing, the first scheduler 210 has a thread control register 211, a counter 212, a count maximum value storage part 213, a comparator circuit 214, and a selector 215.

Figure 3:
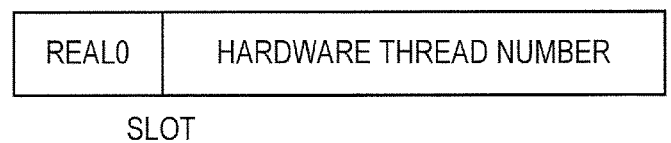
FIG. 3 is a diagram showing one example of a configuration of a slot of a thread control register in the scheduler shown in FIG. 2.

The thread control register 211 has slots (in the illustrated example, eight slots SLT0 to SLT7) whose count is equal to or more than a total number (here, four) of the hardware threads specified in one circulation period. Each slot has, as shown in FIG. 3, a number storage part for storing the hardware thread number and a real time bit storage part for storing a flag (namely, a value of the real time bit signal REAL0) indicating a logic level of the real time bit signal when that slot is selected.

In this embodiment, "1" is stored in the slot SLT0 and the slot SLT2, respectively, as a flag indicating a logic level of the real time bit signal REAL0, and "0" (A1) and "1" (A2) are stored therein as the hardware thread numbers, respectively.

Moreover, "0" is stored in the slot SLT1 and the slot SLT3, respectively, as a flag indicating the logic level of the real time bit signal REAL0. As will be understood by a later explanation, when a slot for storing "0" as a flag is selected, the hardware thread number stored in the slot is also outputted as the first number SN1, but the first number SN1 at this time is not used. Therefore, arbitrary values may be stored in the slot SLT1 and the slot SLT3 as the hardware thread numbers.

Moreover, in the case of this example, since slots SLT4 to slot SLT7 are not used, arbitrary values are stored therein.

The counter 212 updates a count value CNT at predetermined intervals. Specifically, the counter 212 in this embodiment counts up the count value CNT in synchronization with an operation clock (not illustrated) of the multi-thread processor 130.

The count maximum value storage part 213 stores a count maximum value CNTM that defines an upper limit of the count value CNT of the counter 212. This count maximum value CNTM is a hardware thread number that the scheduler 200 specifies in one circulation period, and is set to "4" here.

The comparator circuit 214 compares the count value CNT and the count maximum value CNTM, and when the count value CNT and the count maximum value CNTM coincide, it outputs a reset signal RST for resetting the count value of the counter 212. That is, the counter 212 outputs the count value CNT whose value is updated cyclically by repeating a count-up operation while initializing the count value CNT at a predetermined cycle.

The selector 215 selects one of the slots in the thread control register 211 according to the count value CNT and outputs the real time bit signal REAL0 and the first number SN1 based on a value stored in the selected slot. Specifically, when the count value CNT is 0, the selector 215 selects the slot SLT0, specifies a hardware thread number stored in the number storage part of the slot SLT0 as the first number SN1, and specifies a value of the flag stored in the real time bit storage part of the slot SLT0 as the logic level of the real time bit signal REAL0.

Incidentally, a value stored in a slot of the thread control register 211, an initial value of the count value CNT of the counter 212, and the count maximum value CNTM stored in the count maximum value storage part 213 are set by the management program that is executed at the time of start of the multi-thread processor 130. Moreover, the management program shall read these set values from the memory 110.

The real time bit signal REAL0 from the first scheduler 210 and a signal (a state signal STA described later) from the selector 222 are inputted into the rescheduler 220, which outputs a real time bit signal REAL1.

The thread state management unit 230 monitors whether each hardware thread of the multi-thread processor 130 is in a dispatchable or a nondispatchable state, and outputs a monitored result to the selector 222. For example, when the hardware threads A1, A2, and B1 to B3 are "execution dispatchable," "nondispatchable," "dispatchable," "dispatchable," and "dispatchable," respectively, the thread state management unit 230 outputs a signal "10111" to the selector 222.

The signal from the thread state management unit 230 and the first number SN1 from the first scheduler 210 are inputted into the selector 222. The selector 222 selects a bit that indicates a state of the hardware thread indicated by the first number SN1 from among bits of the signal from the thread state management unit 230, and outputs it to the rescheduler 220 as the state signal STA.

The rescheduler 220 outputs "0" as the real time bit signal REAL1 when the real time bit signal REAL0 from the first scheduler 210 is "0."

On the other hand, when the real time bit signal REAL0 is "1," the rescheduler 220 outputs either one of "0" or "1" as the real time bit signal REAL1 according to the state signal STA from the selector 222. Specifically, it outputs "1" when the state signal STA is "1," and "0" when the state signal STA is "0" as the real time bit signal REAL1.

For example, suppose that the real time bit signal REAL0 that is "1" and the first number SN1 that is "0" are outputted from the first scheduler 210. In this case, since when the hardware thread A1 indicated by the first number SN1 is dispatchable, "1" is outputted from the selector 222 as the state signal STA, the rescheduler 220 outputs "1" as the real time bit signal REAL1. On the other hand, since when the hardware thread A1 is nondispatchable, "0" is outputted from the selector 222 as the state signal STA, the rescheduler 220 outputs "0" as the real time bit signal REAL1.

Figure 4:
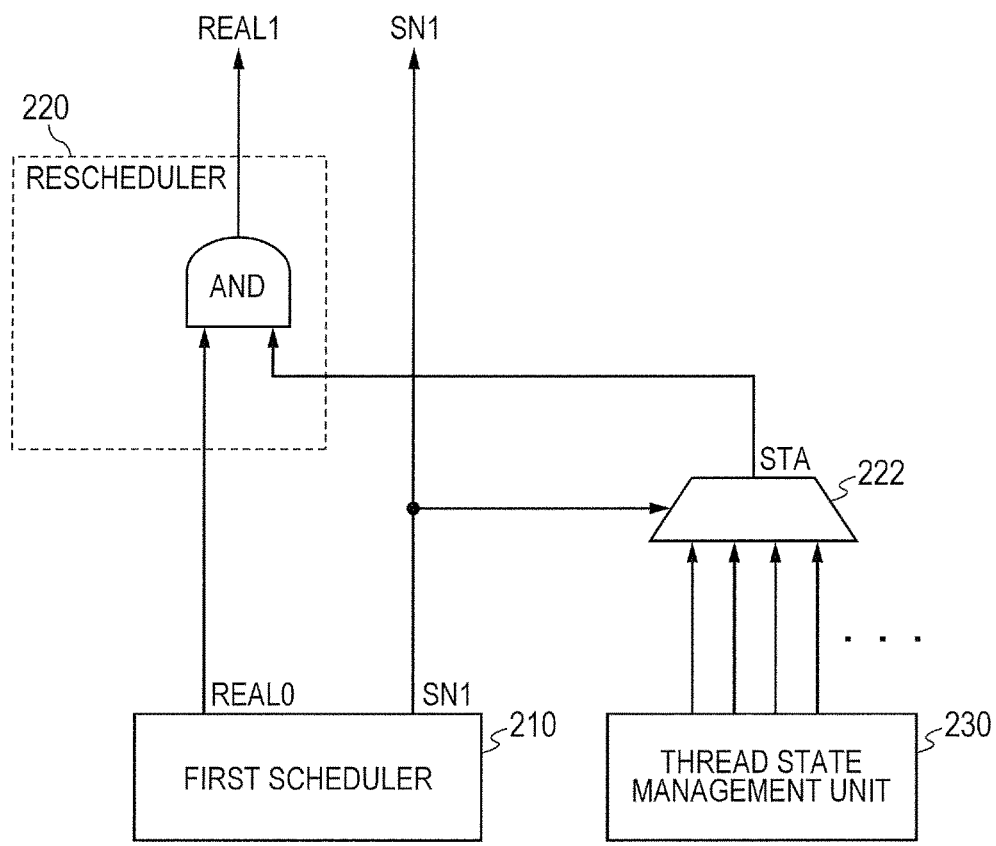
FIG. 4 is a diagram showing one example of a circuit configuration of a rescheduler in the scheduler shown in FIG. 2.

FIG. 4 shows one example of a circuit configuration of the rescheduler 220. In this example, the rescheduler 220 includes an AND circuit. That is, the state signal STA from the selector 222 and the real time bit signal REAL1 from the first scheduler 210 are inputted into the rescheduler 220, which outputs a logical product of them as the real time bit signal REAL1.

Returning to FIG. 2, its explanation is given. The rescheduler 220 generates the real time bit signal REAL1 based on the real time bit signal REAL0 from the first scheduler 210 and the state signal STA from the selector 222 and outputs it to the selector 250 as described above. This real time bit signal REAL1 serves as a control signal of the selector 250.

Based on the real time bit signal REAL1 from the rescheduler 220, the selector 250 selects either one of the first number SN1 that the first scheduler 210 outputted or a second number SN2 that the second scheduler 240 outputted.

The second scheduler 240 performs scheduling of each of the hardware threads (B1 to B3) of the second group among five hardware threads of the multi-thread processor 130. Specifically, the second scheduler 240 selects an arbitrary one from among the hardware threads B1 to B3, and outputs the selected hardware thread number to the selector 250. The number outputted from the second scheduler 240 to the selector 250 is the second number SN2.

Incidentally, a scheduling technique by the second scheduler 240 can be an arbitrary technique, such as the round robin system and the priority system that are known conventionally.

The selector 250 selects the first number SN1 when the real time bit signal REAL1 is "1," and selects the second number SN2 when the real time bit signal REAL1 is "0." The number that the selector 250 selected is outputted to the selector 164 of the multi-thread processor 130 as the thread selection signal TSEL.

As described above, the selector 164 selects an instruction that the hardware thread to be executed next among the five hardware threads generates and outputs it to the arithmetic operation circuit 140. That is, the hardware thread that the multi-thread processor 130 performs next is decided by the thread selection signal TSEL.

Operations of the first scheduler 210, the rescheduler 220, and the second scheduler 240 are summarized.

The first scheduler 210 outputs, for every circulation period (each time the hardware thread is specified four times), "1" and "0" (the hardware thread A1) and "1" and 1" (the hardware thread A2), "0," and an arbitrary number sequentially as the real time bit signal REAL0 that indicates either the first group or the second group and the first number SN1.

When the real time bit signal REAL0 from the first scheduler 210 is "0," the rescheduler 220 outputs the real time bit signal REAL1 that is equivalent to the real time bit signal REAL0, i.e., "0" to the selector 250. On the other hand, in the case where the real time bit signal REAL0 is "1," when the hardware thread indicated by the first number SN1 is dispatchable, the rescheduler 220 outputs the real time bit signal REAL1 that is equivalent to the real time bit signal REAL1, i.e., "1," but when the hardware thread indicated by the first number SN1 is nondispatchable, it outputs the real time bit signal REAL1 that is "0."

The second scheduler 240 outputs an arbitrary hardware thread number among the hardware threads (B1 to B3) in the second group to the selector 250 as the second number SN2.

The selector 250 selects the first number SN1 from the first scheduler 210 when the real time bit signal REAL1 from the rescheduler 220 is "1," or selects the second number SN2 from the second scheduler 240 when the real time bit signal REAL1 from the rescheduler 220 is "0" as the thread selection signal TSEL, and outputs it to the selector 164.

Figure 5:
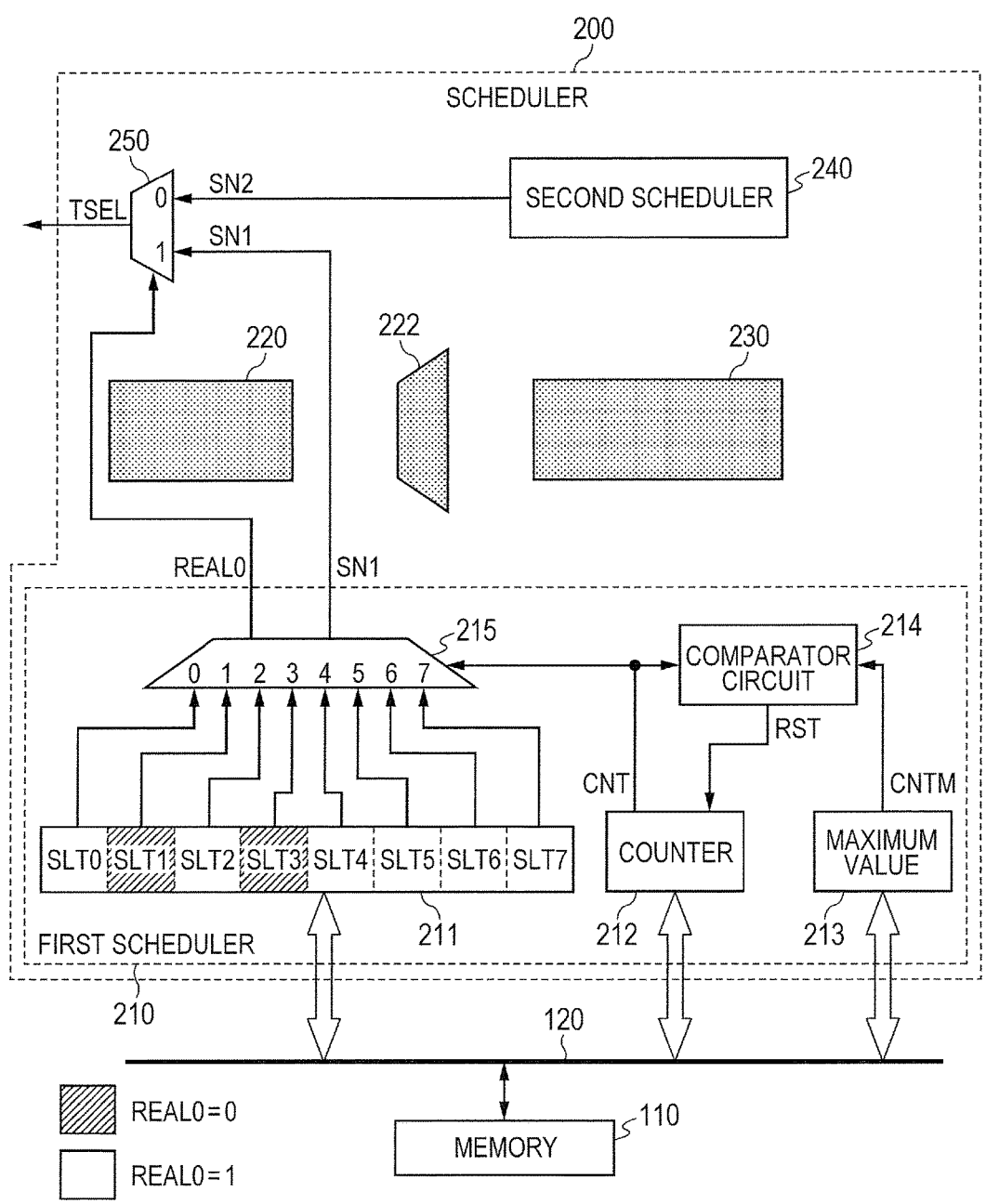
FIG. 5 is a diagram showing one example of a circuit configuration of the scheduler shown in FIG. 2 when it is assumed that there is no rescheduler.

Here, when it is assumed that there is no rescheduler 220 in the scheduler 200, one example of scheduling by the scheduler 200 is considered. FIG. 5 shows a circuit configuration example of the scheduler 200 in this assumption case.

In FIG. 5, what is painted out with dots represents a functional block that is assumed not to exist. As illustrated in the drawing, in this case, there do not exist the rescheduler 220, the selector 222, and the thread state management unit 230. Therefore, the real time bit signal REAL0 from the first scheduler 210 is directly inputted into the selector 250.

Figure 6:
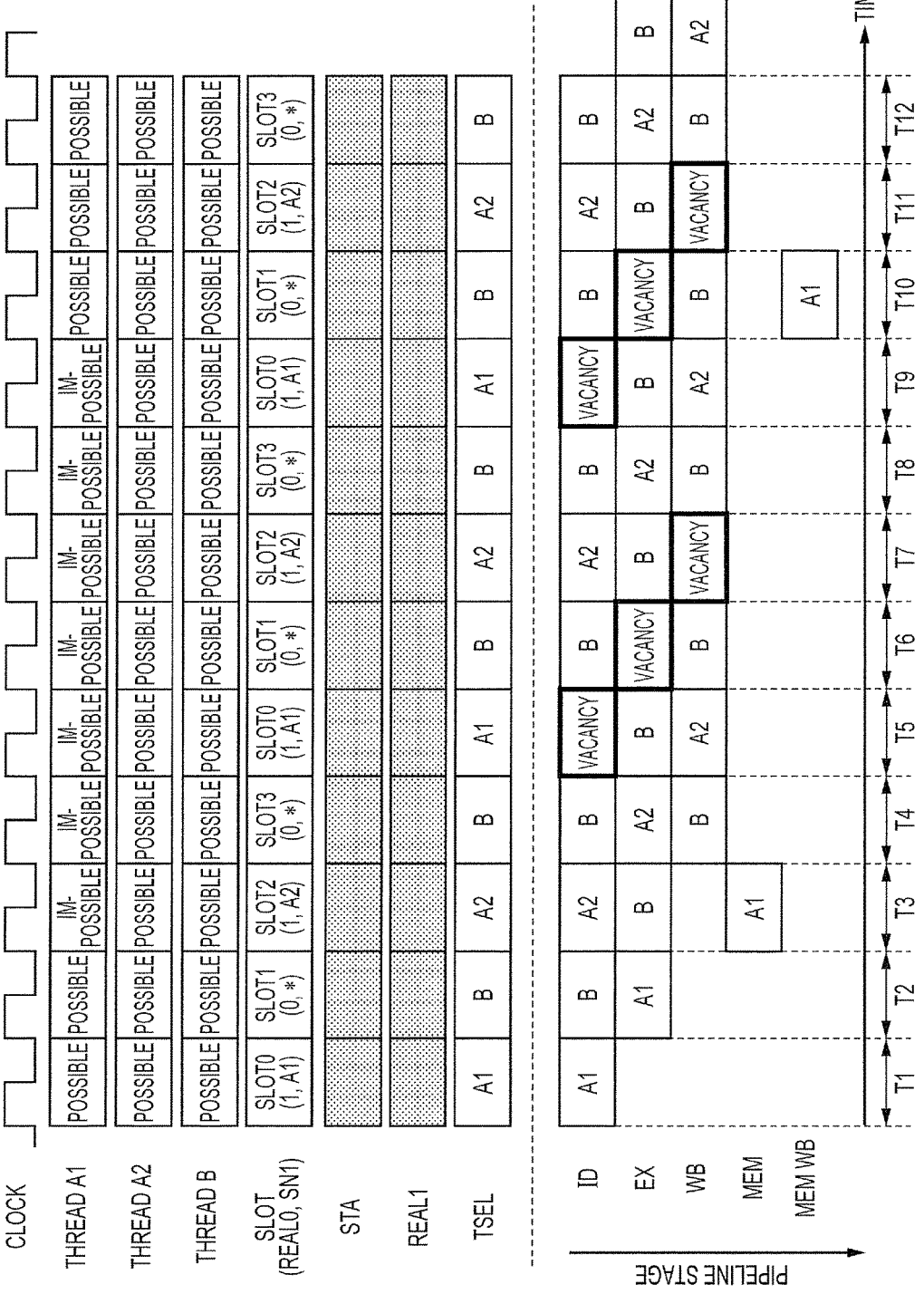
FIG. 6 is a diagram showing one example of scheduling by the scheduler shown in FIG. 5.

FIG. 6 shows one example of the scheduling by the scheduler 200 in the case of a circuit configuration shown in FIG. 5. In each drawing of FIG. 6 and subsequent figures, "possible" and "impossible" indicate that the pertinent hardware thread is "dispatchable" and "nondispatchable," respectively, and "vacancy" indicates that nothing is executed. Moreover, "B" represents any one of the hardware threads (B1 to B3) of the second group.

Moreover, "ID," "EX," "WB," "MEM," and "MEM WB" represent stage "instruction decode," "instruction execution," "register write back," "memory access," and "memory write back," respectively. Incidentally, these stages are exemplifications, and stages of a pipeline differ depending on the specification of the processor.

As shown in FIG. 6, since the slot SLT0 is selected in a first cycle (T1) of the clock, "1" and "0" (A1) are outputted to the selector 250 as the real time bit signal REAL0 and the first number SN1. Therefore, the number "0" of A1 is outputted from the selector 250 as a hardware thread to be executed next. As a result, an instruction that the hardware thread A1 generated is executed. Specifically, a processing of an "ID" stage of the instruction that the hardware thread A1 generated is started.

Since the slot SLT1 is selected in a second cycle (T2) of the clock, "0" and "*" (an arbitrary number) are outputted as the real time bit signal REAL0 and the first number SN1 to the selector 250, and any one of 3 to 5 (the hardware thread B) is outputted as the second number SN2 thereto. Therefore, the number (any one of 3 to 5) of the hardware thread B is outputted as the hardware thread to be executed next from the selector 250. As a result, the instruction that the hardware thread B generated is executed.

Similarly, in a third cycle (T3) of the clock, the number (1) of the hardware thread A2 is selected and an instruction that the hardware thread A2 generated is executed. Next, in a fourth cycle (T4), the number of the hardware thread B is selected and an instruction that the hardware thread B generated is executed.

Incidentally, in the cycle T3, although a processing of a "MEM" stage of the hardware thread A1 is executed, the flow cannot go to the next stage because of I/O waiting, and the instruction becomes nondispatchable. In the example of FIG. 6, the "nondispatchable" state of the hardware thread A1 continues until a cycle T9.

Cycles T1 to T4 are one circulation period of the scheduling. As illustrated in the drawing, in the circulation period, a ratio of execution times assigned to A1, A2, and B is "1:1:2" according to a schedule set up in advance.

Subsequently, scheduling of the next circulation period (cycles T5 to T8) is performed. Similarly with the circulation period of the cycles T1 to T4, numbers of A1, B, A2, and B are outputted sequentially from the selector 250.

However, in the cycle T5, although the hardware thread A1 is specified as a hardware thread to be executed next, the hardware thread A1 is "nondispatchable." Therefore, in the cycle T5, nothing will be executed on the "ID" stage. As a result, nothing is executed also on an "EX" stage in the cycle T6 and on a "WB" stage in the cycle T7.

The same thing occurs also in the circulation period of the cycle T9 to a cycle T12. Incidentally, in the cycle T10, the hardware thread A1 completes I/O access and returns to a "dispatchable" state. Therefore, in a circulation period (not illustrated) that begins from the next cycle of the cycle T12, the pipeline processing becomes the same as that of the circulation period of the cycle T1 to the cycle T4.

As is clear from FIG. 6, by the hardware thread A1 becoming the "nondispatchable" state, a vacancy will occurs in the execution slot and performance of the processor will fall.

In the case where it was assumed that there is no rescheduler 220, one example of the scheduling by the scheduler 200 was explained with reference to FIG. 6.

Figure 7:
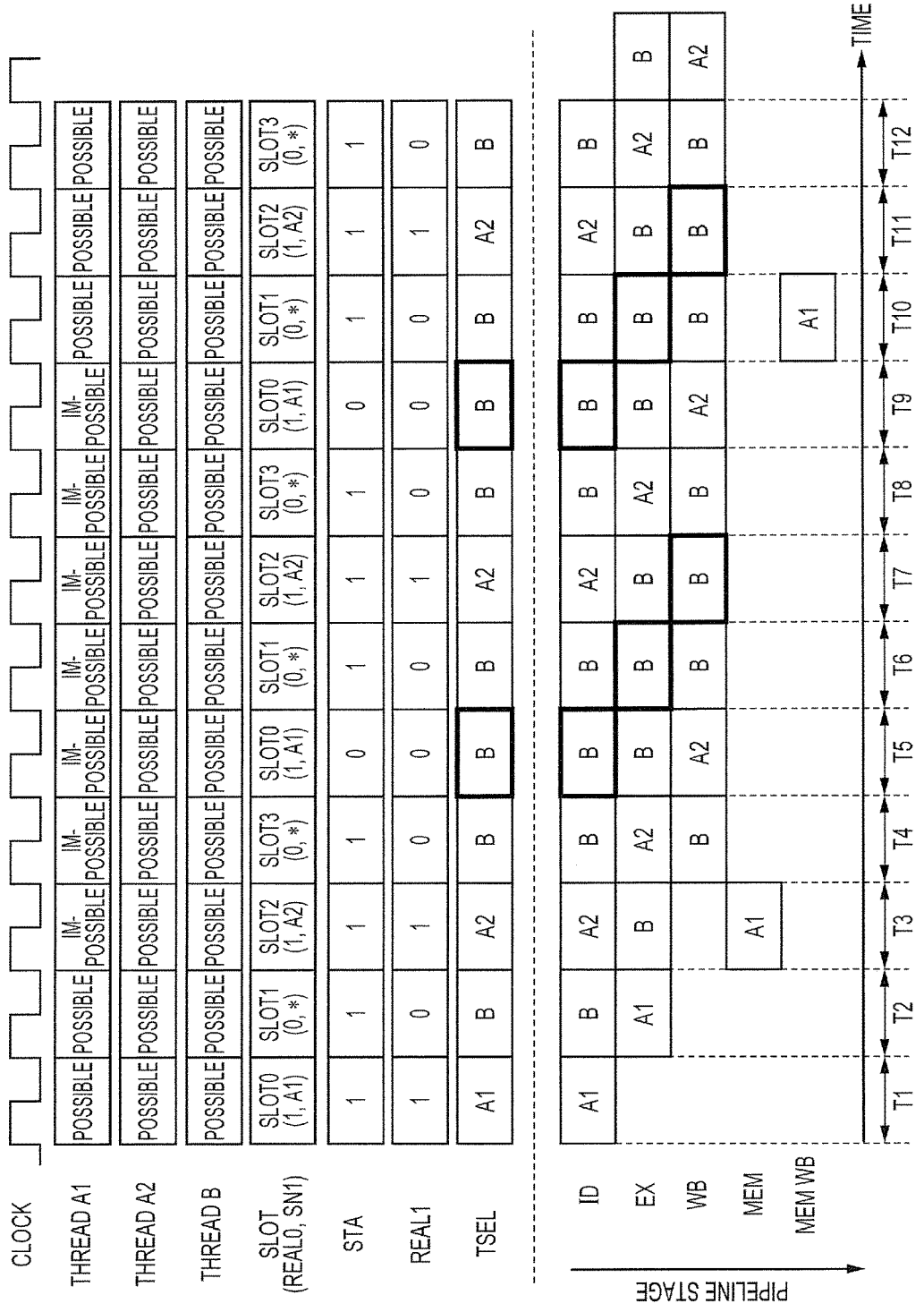
FIG. 7 is a diagram showing one example of scheduling by the scheduler shown in FIG. 2.

FIG. 7 is a diagram showing an example of the scheduling by the scheduler 200 in the case without the above-mentioned assumption, namely in this embodiment.

As shown in FIG. 7, in the circulation period of the cycles T1 to T4, similarly with the example shown in FIG. 6, each hardware thread is specified and executed in order of the hardware thread A1, the hardware thread B, the hardware thread A2, and the hardware thread B.

In the cycle T5, the slot SLT0 is selected and "1" and "0" (A1) are outputted as the real time bit signal REAL0 and the first number SN1 from the first scheduler 210, respectively. However, since the hardware thread A1 is nondispatchable, the rescheduler 220 outputs "0" for the real time bit signal REAL1. As a result, in this cycle, the second number SN2 for indicating the hardware thread B is outputted from the selector 250 as the thread selection signal TSEL.

That is, although the hardware thread A1 is once specified by the thread scheduling, the hardware thread B is specified by the rescheduling instead of the hardware thread A1.

In FIG. 7 and subsequent figures, about the thread selection signal TSEL, a thin line frame of solid line shows a result of the thread scheduling, and a thick line frame of solid line shows a result of the rescheduling.

As shown in FIG. 7, also in the cycle T9, the rescheduling is performed, whereby the hardware thread B is specified instead of the hardware thread A1 specified by the thread scheduling.

As a result, even when the hardware thread A1 goes into the "nondispatchable" state, a vacancy does not arise in the execution slot. As a result, the performance decrement of the processor is avoided.

Second Embodiment

A second embodiment is also a processor system. Incidentally, the processor system according to the second embodiment is the same as the processor system 100 except for a point where a scheduler 300 is provided to the processor system 100 of the first embodiment instead of the scheduler 200. Therefore, only the scheduler 300 will be explained for the processor system according to the second embodiment. Moreover, in giving the explanation, the same example as that of the multiple hardware threads in the processor system 100 will be used.

In addition to the thread scheduling and the rescheduling described above, the scheduler 300 further performs counting of the number of times of waste and restoration scheduling that will be described later.

Each time each hardware thread (A1, A2) of the first group is rescheduled, the scheduler 300 counts up each number of times of waste.

As described above, the rescheduling is a processing of, when the hardware thread of the first group is specified by the thread scheduling but that hardware thread is nondispatchable, respecifying the hardware thread (B) of the second group instead of the hardware thread. That is, the number of times of waste counted up to the hardware thread A1 or the hardware thread A2 becomes the number of times that is specified by the thread scheduling when that hardware thread is nondispatchable and in which the hardware thread (B) of the second group is specified instead by the rescheduling.

The scheduler 300 performs the restoration scheduling based on the number of times of waste of each hardware thread of the first group. Specifically, when the hardware thread of the second group is specified by the thread scheduling, the scheduler 300 checks whether the hardware thread whose number of times of waste is equal to or more than "1" exists in the first group.

When there exists a corresponding hardware thread in the first group and that hardware thread is dispatchable, the scheduler 300 respecifies the relevant hardware thread in the first group (the restoration scheduling) instead of the hardware thread B specified by the thread scheduling. Simultaneously, the number of times of waste of that hardware thread is counted down.

On the other hand, either when there is no corresponding hardware thread in the first group or when although there is the corresponding hardware thread, the hardware thread is nondispatchable, the scheduler 300 does not perform the restoration scheduling. That is, in this case, the scheduler 300 specifies the hardware thread B specified by the thread scheduling.

That is, the scheduler 300 performs thread scheduling of repeating in principle a schedule set up in advance. Then, when although the hardware thread A is specified by the thread scheduling, the hardware thread A is nondispatchable, the scheduler 300 performs the rescheduling of respecifying the hardware thread B instead of the hardware thread A, and counts up the number of times of waste of the hardware thread A.

Moreover, in the case where the hardware thread B is specified by the thread scheduling, when there is the hardware thread A whose number of times of waste is one or more and the hardware thread A is dispatchable, the scheduler 300 performs the restoration scheduling of respecifying the hardware thread A instead of the hardware thread B specified by the thread scheduling, and counts down the number of times of waste of the hardware thread A.

Thus, the scheduler 300 realizes best efforts, like the scheduler 200 of the first embodiment, in both the scheduling according to the schedule set up in advance and avoidance of the performance decrement of the multi-thread processor 130.

Furthermore, by counting the number of times of waste for every hardware thread of the first group and performing the restoration scheduling based on the number of times of waste, the scheduler 300 can bring a ratio of execution of the hardware threads of the first group closer to a designer's setup throughout multiple circulation periods even if the hardware threads of the first group cannot be executed at an exact ratio that the designer designed in an individual circulation period.

Figure 8:
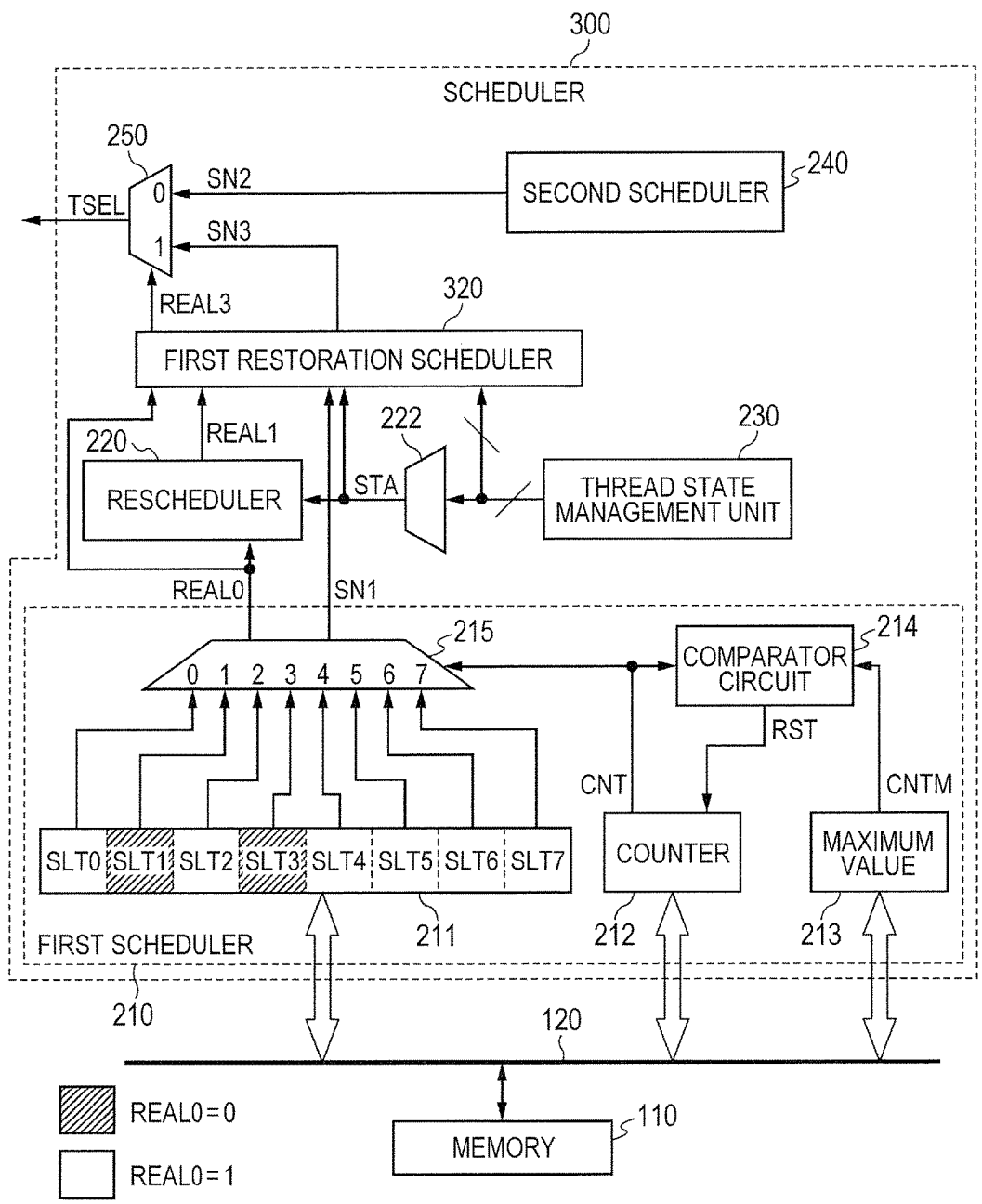
FIG. 8 is a diagram showing a scheduler in a processor system according to a second embodiment.

FIG. 8 shows one example of a circuit configuration of the scheduler 300. As shown in FIG. 8, the scheduler 300 is the same as the scheduler 200 shown in FIG. 2 except for a point where a first restoration scheduler 320 is provided to the scheduler 200. Here, its explanation will be given with an emphasis on the first restoration scheduler 320. Incidentally, in the scheduler 300, a third number SN3 and a real time bit signal REAL3 that the first restoration scheduler 320 outputs are inputted into the selector 250 instead of the first number SN1 that the first scheduler 210 in the scheduler 200 shown in FIG. 2 outputs and the real time bit signal REAL0 that the rescheduler 220 therein outputs.

Figure 9:
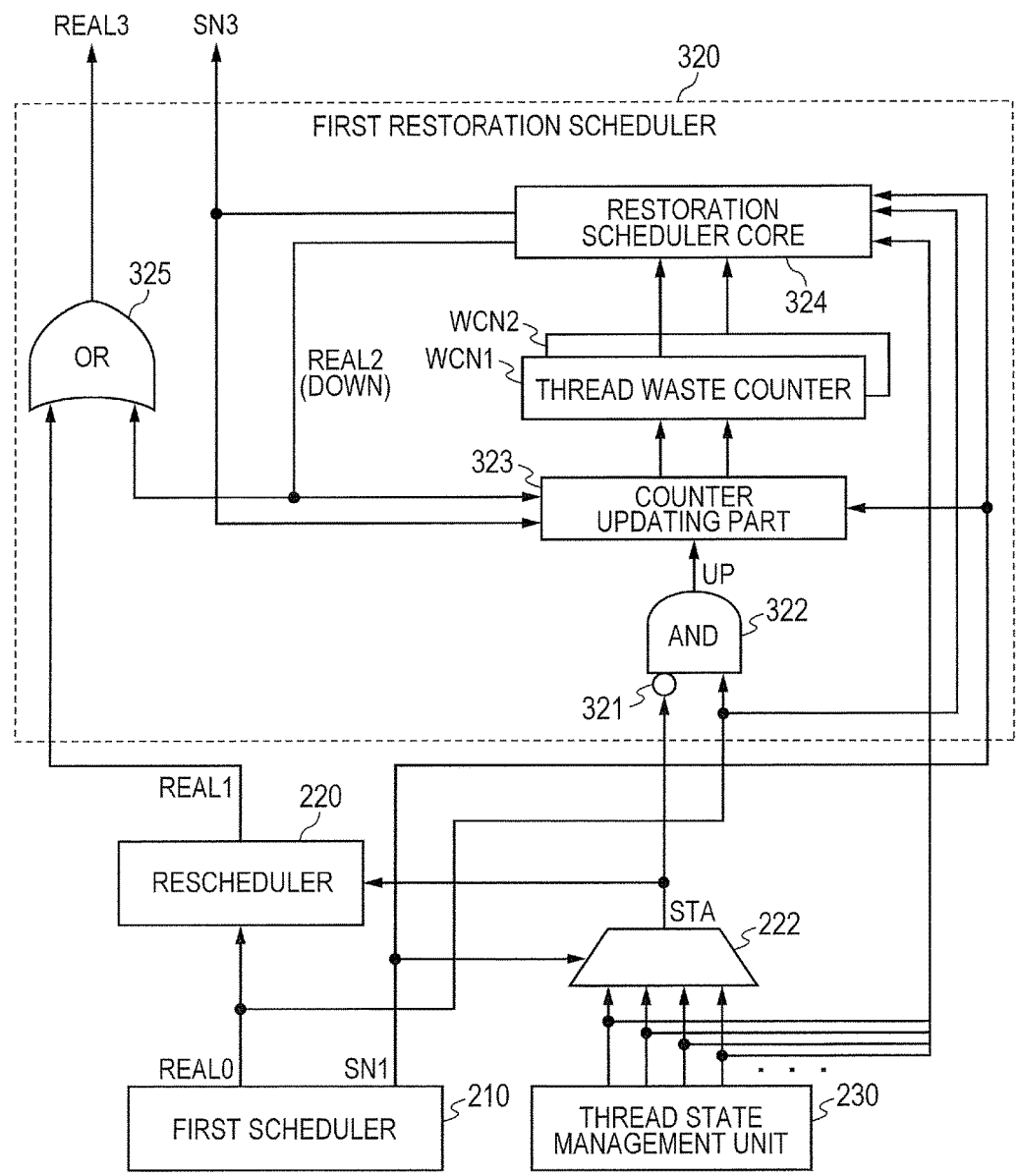
FIG. 9 is a diagram showing one example of a circuit configuration of a first restoration scheduler in the scheduler shown in FIG. 8.

FIG. 9 shows one example of a circuit configuration of the first restoration scheduler 320. As illustrated in the drawing, in this example, the first restoration scheduler 320 has an inverter 321, an AND circuit 322, a counter updating part 323, a thread waste counter WCN1, a thread waste counter WCN2, a restoration scheduler core 324, and an OR circuit 325.

The state signal STA that the selector 222 outputted is also inputted into the inverter 321 of the first restoration scheduler 320, is inverted by the inverter 321, and is outputted to the AND circuit 322. Moreover, the real time bit signal REAL0 from the first scheduler 210 is also inputted into the AND circuit 322.

The AND circuit 322 outputs a logical product (a signal UP) of the inverted signal of the state signal STA and the real time bit signal REAL0 to the counter updating part 323.

Therefore, the signal UP becomes "1" only when the real time bit signal REAL0 is "1" and the state signal STA is "nondispatchable." In other words, the signal UP becomes "1" only when the rescheduling is performed by the scheduler 300.

The counter updating part 323 controls count operations of the thread waste counter WCN1 and the thread waste counter WCN2. The thread waste counter WCN1 and the thread waste counter WCN2 correspond to two hardware threads (A1, A2) in the first group, respectively, and each counts the number of times of waste of the hardware thread according to a control of the counter updating part 323.

The counter updating part 323 controls the count operations of these two thread waste counters by outputting control signals to the thread waste counter WCN1 and the thread waste counter WCN2, respectively.

Regarding the control of count-up, the counter updating part 323 makes the thread waste counter corresponding to the hardware thread A indicated by the first number SN1 count up based on the signal UP from the AND circuit 322 and the first number SN1 from the first scheduler 210 only when the signal UP is "1."

Specifically, for example, when the signal UP is "1" and the first number SN1 is "0" indicating the hardware thread A1, the counter updating part 323 outputs the control signals to the thread waste counter WCN1 and the thread waste counter WCN2, respectively, so that the thread waste counter WCN1 may be made to count up and the thread waste counter WCN2 may be made not to count up.

Similarly, when the signal UP is "1" and the first number SN1 is "1" indicating the hardware thread A2, the counter updating part 323 outputs the control signals to the thread waste counter WCN1 and the thread waste counter WCN2, respectively, so that the thread waste counter WCN1 may be made not to count up and the thread waste counter WCN2 may be made to count up.

Incidentally, when the signal UP is "0," the counter updating part 323 outputs the control signals that make both the thread waste counter WCN1 and the thread waste counter WCN2 not count up to the both. A control of the countdown will be described later.

The restoration scheduler core 324 inputs therein a count value of the thread waste counter WCN1, a count value of the thread waste counter WCN2, the real time bit signal REAL0 from the first scheduler 210 and the first number SN1, and a signal indicating states of respective threads from the thread state management unit 230, and outputs a real time bit signal REAL2 and the third number SN3.

Specifically, only when the real time bit signal REAL0 is "0," a count value (the number of times of waste) of at least one of the thread waste counter WCN1 and the thread waste counter WCN2 is one or more, and the hardware thread A corresponding to the one waste counter is dispatchable, the restoration scheduler core 324 changes the first number SN1 to a number indicating the hardware thread A corresponding to the above-mentioned one waste counter and outputs it as the third number SN3, and at the same time outputs "1" for the real time bit signal REAL2. In cases other than the above, the restoration scheduler core 324 outputs the first number SN1 from the first scheduler 210 as it is, and outputs "0" for the real time bit signal REAL2.

Incidentally, when the count values of both the thread waste counter WCN1 and the thread waste counter WCN2 are each one or more and the both are dispatchable, what is necessary is for the restoration scheduler core 324, for example, to output a number that indicates the hardware thread A corresponding to the thread waste counter having a larger count value, or to output a number that indicates the hardware thread A corresponding to one of the thread waste counters set up in advance for this case, or the like.

The real time bit signal REAL2 outputted from the restoration scheduler core 324 is inputted into the counter updating part 323 and the OR circuit 325. Moreover, the third number SN3 is inputted into the selector 250 and the counter updating part 323.

The counter updating part 323 uses the real time bit signal REAL2 for the control of the countdown. Therefore, the real time bit signal REAL2 is also called a signal DOWN.

Regarding the control of the countdown, specifically, only when the real time bit signal REAL2, i.e., the signal DOWN, is "1," the counter updating part 323 makes the thread waste counter corresponding to the hardware thread A indicated by the third number SN3 count down.

Specifically, for example, when the signal DOWN is "1" and the third number SN3 is "0" indicating the hardware thread A1, the counter updating part 323 outputs the control signals to the thread waste counter WCN1 and the thread waste counter WCN2, respectively, so that the thread waste counter WCN1 may be made to count down and the thread waste counter WCN2 may be made not to count down.

Similarly, when the signal DOWN is "1" and the third number SN3 is "1" indicating the hardware thread A2, the counter updating part 323 outputs the control signals to the thread waste counter WCN1 and the thread waste counter WCN2, respectively, so that the thread waste counter WCN1 may be made not to count down but the thread waste counter WCN2 may be made to count down.

Incidentally, when the signal DOWN is "0," the counter updating part 323 outputs the control signals that make both the thread waste counter WCN1 and the thread waste counter WCN2 not count down.

The OR circuit 325 outputs a logical addition (the real time bit signal REAL3) of the real time bit signal REAL1 from the rescheduler 220 and the real time bit signal REAL2 from the restoration scheduler core 324 to the selector 250.

As the thread selection signal TSEL, the selector 250 selects the third number SN3 when the real time bit signal REAL3 is "1" and selects the second number SN2 from the second scheduler 240 when the real time bit signal REAL3 is "0."

Figure 10:
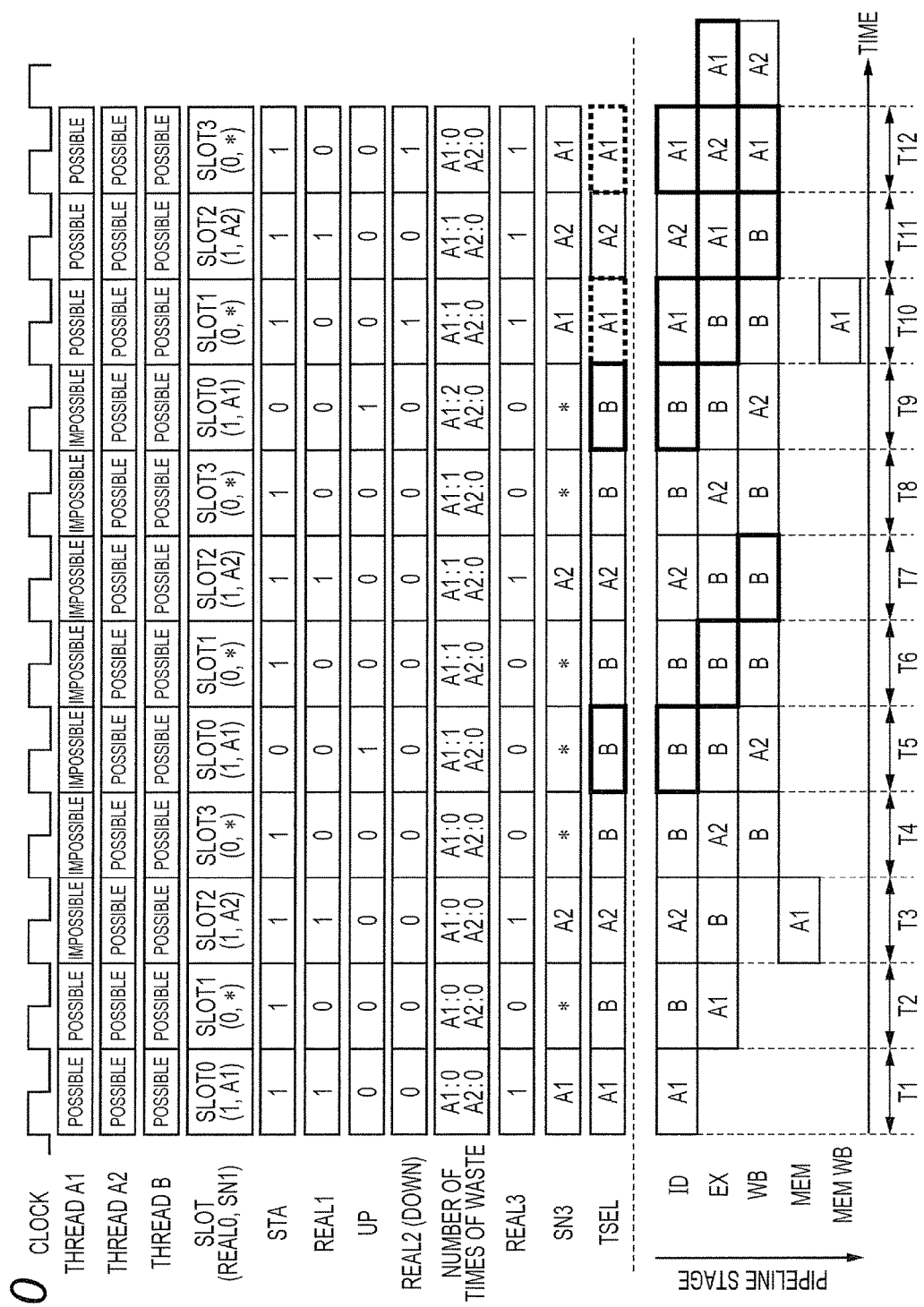
FIG. 10 is a diagram showing one example of scheduling by the scheduler shown in FIG. 8.

With reference to FIG. 10, an example of scheduling by the scheduler 300 according to this embodiment will be explained. Incidentally, in FIG. 10, like FIG. 7, regarding the thread selection signal TSEL, a thin line frame of solid line represents a result of the scheduling and a thick line frame of solid line represents a result of the rescheduling. Furthermore, a thick line frame of dotted line represents a result of the restoration scheduling.

As shown in FIG. 10, in a first circulation period (the cycles T1 to T4), hardware threads are specified and executed by the thread scheduling in order of the hardware thread A1, the hardware thread B, the hardware thread A2, and the hardware thread B.

In the cycle T5, the slot SLT0 is selected, and "1" and "0" (A1) are outputted as the real time bit signal REAL0 and the first number SN1 from the first scheduler 210. However, since the hardware thread A1 is nondispatchable, the rescheduling is performed and the second number SN2 indicating the hardware thread B is outputted from the selector 250 as the thread selection signal TSEL.

Moreover, in this cycle, since the rescheduling was performed on the hardware thread A1, the signal UP becomes "1" and the count value of the thread waste counter WCN1 corresponding to the hardware thread A1 becomes unity from zero by count-up.

In the cycles T6 to T8 of the second circulation period, the hardware thread B, the hardware thread A2, and the hardware thread B are specified sequentially by the thread scheduling.

Incidentally, in the cycles T6 and T8, the hardware thread B is specified by the thread scheduling and the count value of the thread waste counter WCN1 is unity. However, since the hardware thread A1 is still nondispatchable as before, the restoration scheduling is not performed.

After entering a third circulation period, the hardware thread A1 is specified by the thread scheduling in the cycle T9. However, since the hardware thread A1 is still nondispatchable as before, the rescheduling is performed, alteration of specification from the hardware thread A1 to the hardware thread B is performed, the signal UP becomes "1" again, and the count value of the thread waste counter WCN1 becomes two from unity by the count-up.

The hardware thread B is specified by the thread scheduling in the cycle T10. However, since the count value of the thread waste counter WCN1 is "2" and the hardware thread A1 has become dispatchable, the restoration scheduling is performed and alteration of specification from the hardware thread B to the hardware thread A1 is performed. Simultaneously, the real time bit signal REAL2 (DOWN) becomes "1," and the count value of the thread waste counter WCN1 becomes unity from two by the countdown.

Similarly, also in the cycle T12, the restoration scheduling is performed and the alteration of specification from the hardware thread B to the hardware thread A1 is performed. Simultaneously, the real time bit signal REAL2 (DOWN) becomes "1" again, and the count value of the thread waste counter WCN1 is becomes zero from unity by the countdown.

As shown in FIG. 10, the ratio of the execution times of the hardware threads A1, A2, and B is not "1:1:2" in the circulation period in which the rescheduling or the restoration scheduling occurs. However, seeing it throughout three circulation periods having the cycles T1 to T12, the ratio of the execution times of the hardware threads A1, A2, and B falls to "1:1:2" as designed.

Third Embodiment

A third embodiment is also a processor system. Incidentally, the processor system according to the third embodiment is the same as the processor system 100 according to the first embodiment except for a point where a scheduler 400 is provided to the processor system 100 instead of the scheduler 200. Therefore, only the scheduler 400 will be explained regarding the processor system in the third embodiment. Moreover, in giving the explanation, the same example as the multiple hardware threads in the processor system 100 will be used.

The scheduler 400 further performs, like the scheduler 300 of the second embodiment, counting of the number of times of waste and the restoration scheduling in addition to the thread scheduling and the rescheduling. However, whereas the scheduler 300 counts the number of times of waste for every hardware thread A, the scheduler 400 counts the number of times of waste for the whole of the first group. Therefore, the restoration scheduling that the scheduler 400 performs also differs from the restoration scheduling that the scheduler 300 performs. Below, the number of times of waste that the scheduler 400 counts is called the "number of times of group waste."

The scheduler 400 counts up the number of times of group waste when the rescheduling has been made on any one of the hardware threads in the first group.

As described above, the rescheduling is a processing of when although the hardware thread of the first group is specified by the thread scheduling, the hardware thread is nondispatchable, respecifying the hardware thread (B) of the second group instead of the hardware thread. That is, the number of times of group waste becomes the number of times in which that hardware thread is specified by the thread scheduling when any one of the hardware threads of the first group is nondispatchable.

The scheduler 400 performs the restoration scheduling based on the number of times of group waste. Specifically, when the hardware thread of the second group is specified by the thread scheduling, the scheduler 400 checks whether the number of times of group waste is "0."

When the number of times of group waste is one or more and there is a dispatchable hardware thread in the first group, the scheduler 400 respecifies the dispatchable hardware thread in the first group instead of the hardware thread B specified by the thread scheduling. Simultaneously, it counts down the number of times of group waste.

On the other hand, either when the number of times of group waste is zero or when although the number of times of group waste is one or more, there is no dispatchable hardware thread A, the scheduler 400 does not perform the restoration scheduling. That is, in this case, the scheduler 400 specifies the hardware thread B specified by the thread scheduling.

That is, the scheduler 400 performs the thread scheduling of repeating in principle the schedule set up in advance. Then, when although the hardware thread A is specified by the thread scheduling, the hardware thread A is nondispatchable, the scheduler 400 performs the rescheduling of respecifying the hardware thread B instead of the hardware thread A, and counts up the number of times of group waste.

Moreover, in the case where the hardware thread B is specified by the thread scheduling, when the number of times of group waste is one or more and there is the dispatchable hardware thread A, the scheduler 400 performs the restoration scheduling of respecifying the dispatchable hardware thread A instead of the hardware thread B specified by the thread scheduling, and counts down the number of times of group waste.

Thus, similarly with the scheduler 200 of the first embodiment, the scheduler 400 realizes best efforts in both scheduling according to the schedule set up in advance and avoidance of the performance decrement of the multi-thread processor 130.

Furthermore, by counting the number of times of group waste to the first group and performing the restoration scheduling based on the number of times of group waste, when seeing throughout the multiple circulation periods, it is possible for the scheduler 400 to bring the ratio of execution of the hardware threads between the first group and the second group closer to the designer's setup.

Figure 11:
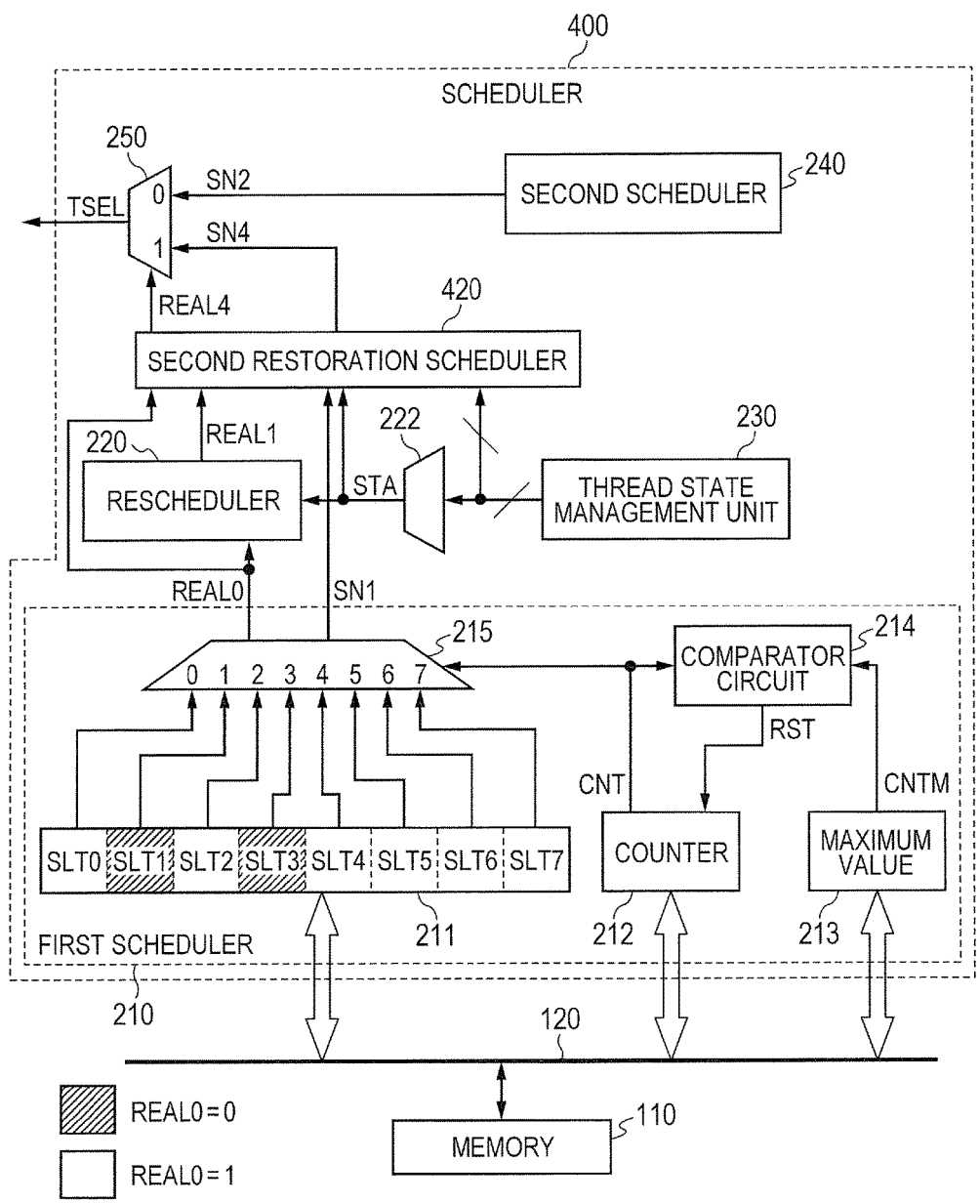
FIG. 11 is a diagram showing a scheduler in a processor system according to a third embodiment.

FIG. 11 shows one example of a circuit configuration of the scheduler 400. The scheduler 400 is the same as the scheduler 200 shown in FIG. 2 except for a point where a second restoration scheduler 420 is further provided to the scheduler 200. Here, it will be explained with an emphasis on the second restoration scheduler 420. Incidentally, in the scheduler 400, a fourth number SN4 and a real time bit signal REAL4 that the second restoration scheduler 420 outputs are inputted into the selector 250 instead of the first number SN1 that the first scheduler 210 in the scheduler 200 shown in FIG. 2 outputs and the real time bit signal REAL0 that the rescheduler 220 in it outputs.

Figure 12:
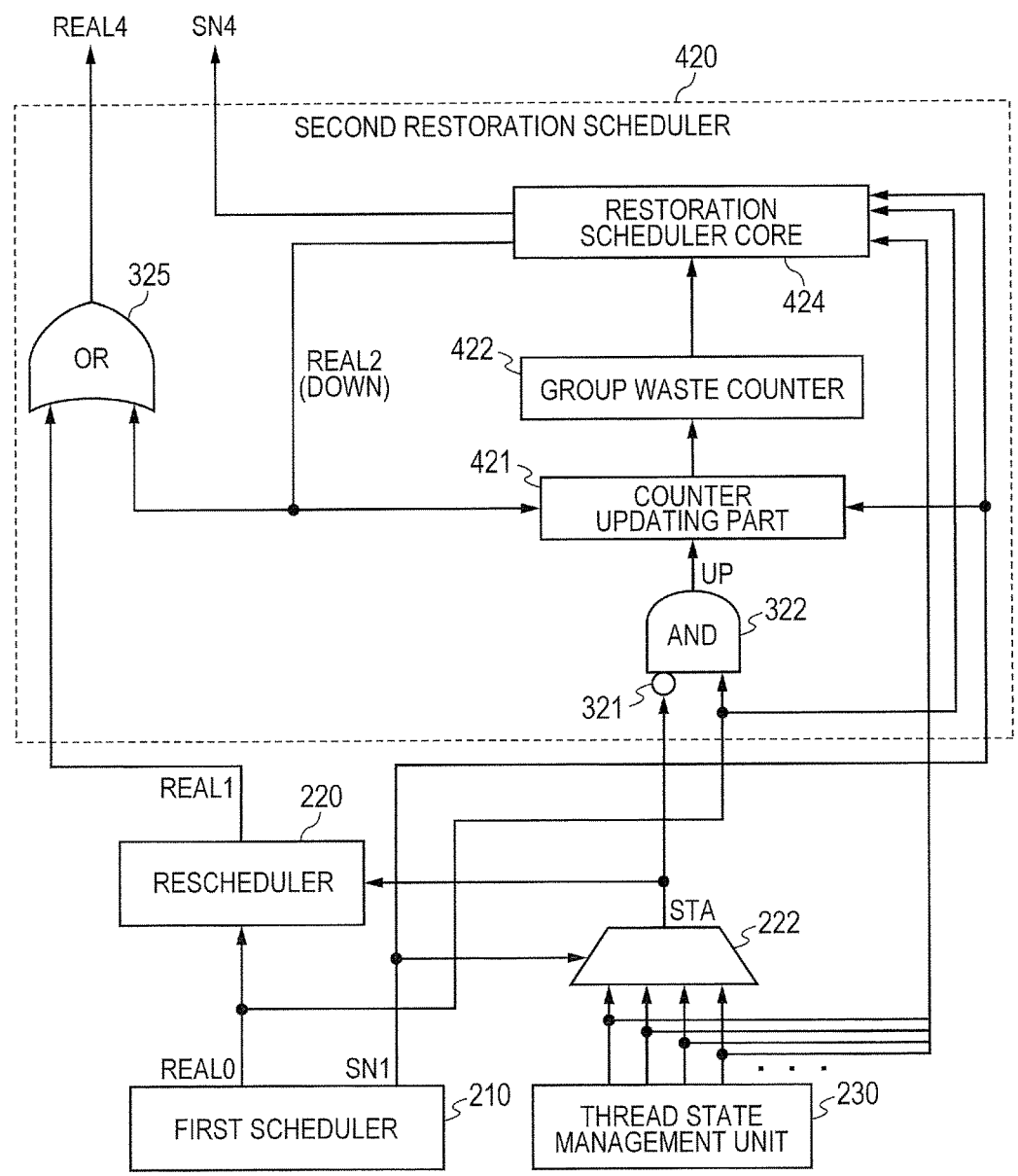
FIG. 12 is a diagram showing one example of a circuit configuration of a second restoration scheduler in the scheduler shown in FIG. 11.

FIG. 12 shows one example of a circuit configuration of the second restoration scheduler 420. As illustrated in the drawing, in the example, the second restoration scheduler 420 has the inverter 321, the AND circuit 322, the OR circuit 325, a counter updating part 421, a group waste counter 422, and a restoration scheduler core 424.

The inverter 321, the AND circuit 322, and the OR circuit 325 are the same as those that are included in the first restoration scheduler 320 and have identical symbols, respectively.

The counter updating part 421 controls a count operation of the group waste counter 422. The group waste counter 422 counts the number of times of group waste to the first group according to the control of the counter updating part 421.

Regarding the control of the count-up, when the signal UP from the AND circuit 322 is "1," the counter updating part 421 outputs a control signal of making the group waste counter 422 count up. On the other hand, when the signal UP is "0," the group waste counter 422 makes the counter updating part 421 not count up. The control of the count-down will be described later.

The restoration scheduler core 424 inputs therein a count value of the group waste counter 422, the real time bit signal REAL0 and the first number SN1 from the first scheduler 210, signals indicating states of the respective threads from the thread state management unit 230, and outputs the real time bit signal REAL2 and the fourth number SN4.

Specifically, only when the real time bit signal REAL0 is "0," the count value (the number of times of group waste) of the group waste counter 422 is one or more, and there is a dispatchable hardware thread in the first group, the restoration scheduler core 424 outputs a number of the dispatchable hardware thread in the first group as the fourth number SN4, and outputs "1" for the real time bit signal REAL2. In cases other than the above, the restoration scheduler core 424 outputs the first number SN1 as the fourth number SN4 as it is, and outputs "0" for the real time bit signal REAL2.

Incidentally, when multiple dispatchable hardware threads exist in the first group, what is necessary is for the restoration scheduler core 424 to select the hardware thread corresponding to the fourth number SN4, for example, in order of priority set up in advance for the hardware thread in the first group. Naturally, a selection technique of the hardware thread in this case is not limited to this example.

The real time bit signal REAL2 outputted from the restoration scheduler core 424 is inputted into the counter updating part 421 and the OR circuit 325. Moreover, the fourth number SN4 is inputted into the selector 250 and the counter updating part 421.

The counter updating part 421 uses the real time bit signal REAL2 for the control of the countdown. Regarding the control of countdown, the counter updating part 421 makes the group waste counter 422 count down only when the real time bit signal REAL2, i.e., the signal DOWN, is "1."

The OR circuit 325 outputs a logical addition (the real time bit signal REAL4) of the real time bit signal REAL1 from the rescheduler 220 and the real time bit signal REAL2 from the restoration scheduler core 424 to the selector 250.

As the thread selection signal TSEL, the selector 250 selects the real time bit signal REAL4 when the real time bit signal REAL4 is "1" and selects the second number SN2 from the second scheduler 240 when the real time bit signal REAL4 is "0."

Figure 13:
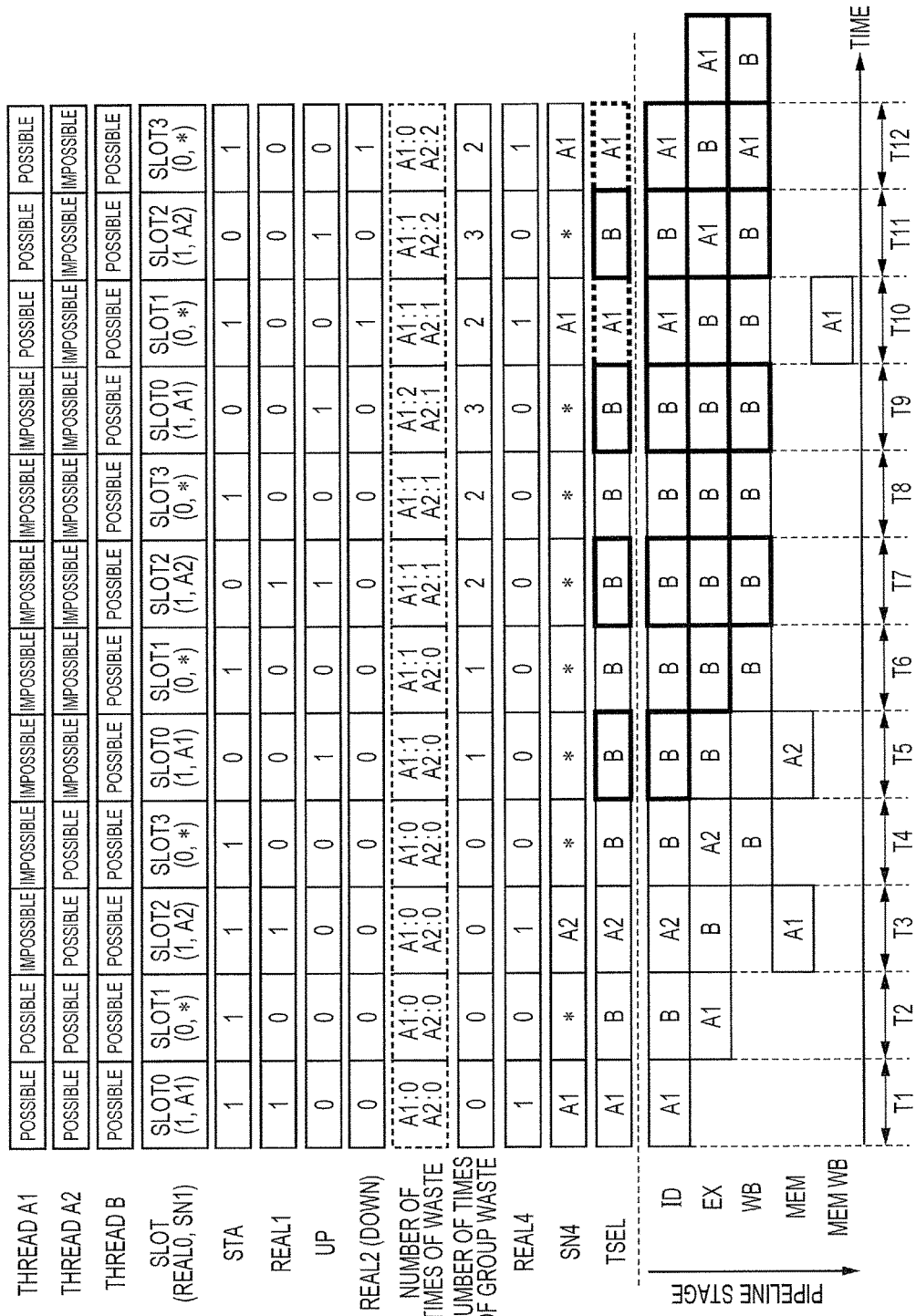
FIG. 13 is a diagram showing one example of scheduling by the scheduler shown in FIG. 11.

With reference to FIG. 13, an example of scheduling by the scheduler 400 in this embodiment will be explained. Incidentally, in FIG. 13, like FIG. 7, with respect to the thread selection signal TSEL, a thin line frame of solid line shows a result of the thread scheduling, and a thick line frame of solid line shows a result of the rescheduling. Furthermore, a thick line frame of dotted line shows a result of the restoration scheduling. Incidentally, in the scheduler 400, although the number of times of waste of every hardware thread A is not counted, in order to compare it with the number of times of group waste that the scheduler 400 counts, FIG. 13 shows the number of times of waste of every hardware thread A with a thin line frame of dotted line.

As shown in FIG. 13, in the first circulation period (the cycles T1 to T4), the hardware threads are specified and executed by the thread scheduling in order of the hardware thread A1, the hardware thread B, the hardware thread A2, and the hardware thread B.

In the cycle T5, the slot SLT0 is selected and "1" and "0" (A1) are outputted as the real time bit signal REAL0 and the first number SN1 from the first scheduler 210. However, since the hardware thread A1 is nondispatchable, the rescheduling is performed and the second number SN2 indicating the hardware thread B is outputted from the selector 250 as the thread selection signal TSEL.

Moreover, in this cycle, since the rescheduling was performed, the signal UP becomes "1" and the count value (the number of times of group waste) of the group waste counter 422 becomes unity from zero by the count-up.

In the cycles T6 to T8 of the second circulation period, the hardware thread B, the hardware thread A2, and the hardware thread B are specified sequentially by the thread scheduling.

In the cycle T6, the hardware thread B is specified by the thread scheduling and the number of times of group waste is unity. However, since both the hardware thread A1 and the hardware thread A2 are nondispatchable, the restoration scheduling is not performed.

In the cycle T7, although the slot SLT2 is selected and the first number SN1 indicates the hardware thread A2, since the hardware thread A2 is nondispatchable, the rescheduling is performed. As a result, the second number SN2 indicating the hardware thread B is outputted from the selector 250 as the thread selection signal TSEL, the signal UP becomes "1" again, and the number of times of group waste becomes two from unity.

Incidentally, in the cycle T8, the hardware thread B is specified by the thread scheduling and the number of times of group waste is two. However, since both the hardware thread A1 and the hardware thread A2 are nondispatchable, the restoration scheduling is not performed.

After entering the third circulation period, in the cycle T9, the hardware thread A1 is specified by the thread scheduling. However, since the hardware thread A1 is still nondispatchable as before, the rescheduling is performed, the alteration of specification from the hardware thread A1 to the hardware thread B is performed, the signal UP becomes "1" again, and the number of times of group waste becomes three from two.

The hardware thread B is specified by the thread scheduling in the cycle T10. However, since the number of times of group waste is "3" and the hardware thread A1 has become dispatchable, the restoration scheduling is performed and the alteration of specification from the hardware thread B to the hardware thread A1 is performed. Simultaneously, the real time bit signal REAL2 (DOWN) becomes "1" and the number of times of group waste becomes two from three.

The hardware thread A2 is specified by the thread scheduling in the cycle T11. However, since the hardware thread A2 is still nondispatchable as before, the rescheduling is performed, alteration of specification from the hardware thread A2 to the hardware thread B is performed, the signal UP becomes "1" again, and the number of times of group waste becomes three from two.

The hardware thread B is specified by the thread scheduling in the cycle T12. However, since the number of times of group waste is "3" and the hardware thread A1 has become dispatchable, the restoration scheduling is performed and the alteration of specification from the hardware thread B to the hardware thread A1 is performed. Simultaneously, the real time bit signal REAL2 (DOWN) becomes "1" again and the number of times of group waste becomes two from three.

Thus, according to the scheduler 400, the ratio of the numbers of times of execution of the hardware threads A, B is not "2:2" as designed in the circulation period in which the rescheduling or the restoration scheduling occurs. However, when seeing throughout the multiple circulation periods, the ratio of the numbers of times of execution of the hardware threads A, B becomes "2:2" as designed.

Fourth Embodiment

Figure 14:
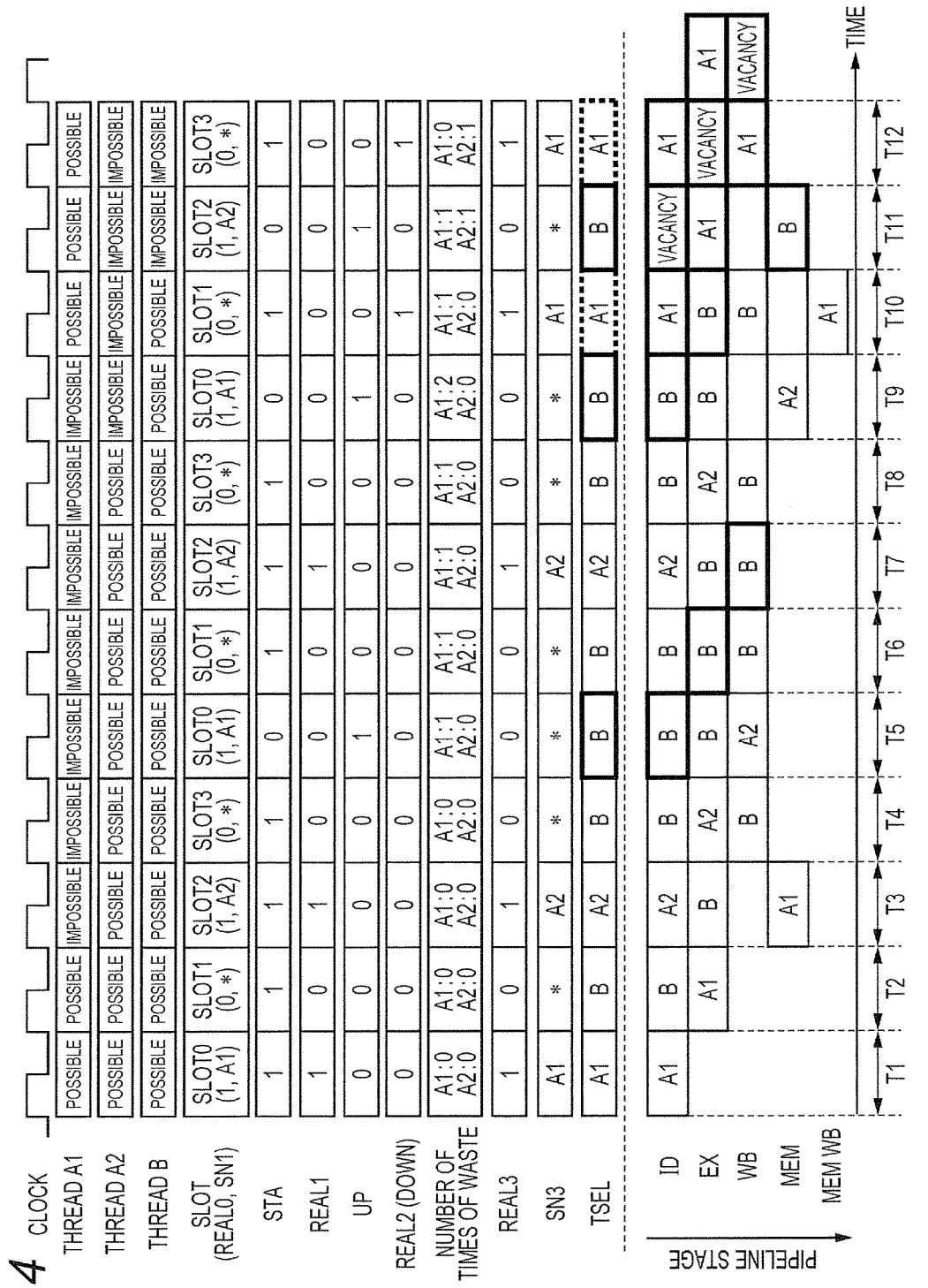
FIG. 14 is a diagram showing another one example of the scheduling by the scheduler shown in FIG. 8 in order to explain a fourth embodiment.

Before describing a fourth embodiment, first, another one example of the scheduling by the scheduler 300 shown in FIG. 8 will be shown with reference to FIG. 14.

An example shown in FIG. 14 is different from the example shown in FIG. 10 in a point that execution of the hardware thread A2 becomes nondispatchable in the cycles T9 to T12, and there is no dispatchable hardware thread B in the cycles T11 to T12.

From the cycle T1 to the cycle T9, the same scheduling as that of the example shown in FIG. 10 is performed by the scheduler 300 shown in FIG. 8.

In the cycle T10, the hardware thread B is specified by the thread scheduling. However, since the number of times of waste of the hardware thread A1 is two and the hardware thread A1 is dispatchable, the hardware thread A1 is specified by the restoration scheduling instead of the hardware thread B. Simultaneously, the number of times of waste of the hardware thread A1 becomes unity from two.

In the cycle T11, although the hardware thread A2 is specified by the thread scheduling, since the hardware thread A2 is nondispatchable, the hardware thread B is specified by the rescheduling. Simultaneously, the number of times of waste of the hardware thread A2 becomes unity from zero.

However, there is no dispatchable hardware thread B in this cycle. Therefore, the execution slot of the "ID" stage will become vacancy.

In the cycle T12, although the hardware thread B is specified by the thread scheduling, since the number of times of waste of the dispatchable hardware thread A1 is unity, the hardware thread A1 is specified by the restoration scheduling. Simultaneously, the number of times of waste of the hardware thread A1 becomes zero from unity.

As shown in FIG. 14, when there is no dispatchable hardware thread B, a vacancy arises in the execution slot resulting from execution of the rescheduling.

The scheduler of the fourth embodiment is the scheduler 300 shown in FIG. 8 that is modified so that the execution time of the hardware thread in the second group may be given to the hardware thread in the first group as the restoration scheduling and the execution times may be interchanged between the hardware threads in the first group.

That is, the scheduler of the fourth embodiment performs the thread scheduling of repeating in principle the schedule set up in advance. Then, although it specifies the hardware thread A by the thread scheduling, when the hardware thread A is nondispatchable, it performs either the rescheduling or the restoration scheduling depending on the number of times of waste and a state of the other hardware thread A.

For example, suppose that the hardware thread A1 being nondispatchable is specified by the thread scheduling. In this case, when the number of times of waste of the hardware thread A2 is zero, the scheduler of the fourth embodiment performs the rescheduling and specifies the hardware thread B. On the other hand, when the number of times of waste of the hardware thread A2 is one or more and the hardware thread A2 is dispatchable, the scheduler of the fourth embodiment performs the restoration scheduling on the hardware thread A2, and specifies the hardware thread A2.

Incidentally, in the case where the hardware thread B is specified by the thread scheduling, similarly with the scheduler 300, when there is the hardware thread A whose number of times of waste is one or more and the hardware thread A is dispatchable, the restoration scheduling is performed and the hardware thread A is specified instead of the hardware thread B specified by the thread scheduling.

Incidentally, since the scheduler of the fourth embodiment is easily realizable by altering the circuit configuration of the scheduler 300, an explanation of a specific circuit configuration example of the scheduler of the fourth embodiment is omitted here.

FIG. 15 shows an example of scheduling by the scheduler of the fourth embodiment for comparing this with the example of the scheduling by the scheduler 300.

As shown in FIG. 15, up to the cycle T10, a result of the scheduling by the scheduler of the fourth embodiment and a result of the scheduling by the scheduler 300 are the same.

In the cycle T11, the scheduler 300 performs the rescheduling and specifies the hardware thread B instead of the hardware thread A2. Contrary to this, in the scheduler of the fourth embodiment, since the number of times of waste of the hardware thread A1 is unity and the hardware thread A1 is dispatchable, the scheduler of the fourth embodiment performs the restoration scheduling instead of the rescheduling and specifies the hardware thread A1 instead of the hardware thread A2.

As a result, the scheduler of the fourth embodiment can perform the restoration scheduling on the hardware thread A whose number of times of waste is one or more, earlier than the scheduler 300.

As described above, although the invention made by the present inventors was specifically explained based on the embodiments, the present invention is not limited to the already described embodiments and it goes without saying that various increase/decrease and variation may be possible within a range that does not deviate from its gist.

The thread scheduling is scheduling as the designer designed. Therefore, a situation where the number of times of rescheduling is large means that the scheduling comes off from the design frequently. Therefore, it is desirable, for example, to add a function of issuing a warning to the outside when the number of times of waste of any one of the hardware threads (either the count value of the thread waste counter WCN1 or the count value of the thread waste counter WCN2) or a total sum of the numbers of times of waste of all the hardware threads reaches a threshold to the scheduler 300 shown in FIG. 8. By such a warning being issued, it becomes possible for the designer to notice abnormality and to perform reexamination of the design or the like. Incidentally, regarding the warning, a technique of generating interruption to the CPU is conceivable, for example.

Naturally, the function of issuing a warning to the outside when the number of times of group waste (the count value of the group waste counter 422) reaches a threshold may be added to the scheduler 400 shown in FIG. 11 similarly.

Moreover, a situation that requires the rescheduling, i.e., a situation that the hardware thread of the first group specified by the thread scheduling is nondispatchable, occurs in the case where the hardware thread does not complete a processing of the stage within an expected time because of I/O waiting etc. At the times when the hardware threads in the multi-thread processor are few in number or like case, such a situation can be expected to some extent. Therefore, when designing the schedule that serves as a base of the thread scheduling, it is also possible to expect generation of such a situation and design a schedule that considers a time of I/O waiting etc. In order to be able to support such a case, it is desirable to configure the thread waste counter WCN1 and the thread waste counter WCN2 of the scheduler 300 and the group waste counter 422 of the scheduler 400, for example, so as to be dynamically alterable with respect to permission and prohibition of the count operation before an operation of an object program.

By carrying out this, it is possible to reduce operating circuits, and therefore to speed up a processing speed and reduce power consumption.

Incidentally, in order to enable a setting of a threshold for the above-mentioned warning function and a setting as to whether an operation of the waste counter or the group waste counter is prohibited, what is necessary is just to provide a register according to those uses, for example.

Moreover, in the each embodiment described above, as an example, although grouping of the threads is performed depending on whether it is the real time thread, it is natural that a technique of grouping the threads is not limited to this example.

What is claimed is:

1. A multi-thread processor, comprising:
   a plurality of hardware threads that generates a plurality of mutually independent instruction streams, respectively; and
   a scheduler that schedules the plurality of hardware threads,
   wherein the scheduler performs a thread scheduling so that:
      the plurality of hardware threads is divided to a first group having first and second hardware threads and a second group having third and fourth hardware threads,
      each of the first and second hardware threads is selected a predetermined number of times, and
      one of the third and fourth hardware threads is selected a predetermined number of times,
   wherein when the first hardware thread is selected by the scheduler and the first hardware thread is nondispatchable, the scheduler performs a rescheduling so that one of the third and fourth hardware threads is selected instead of the first hardware thread even though the second hardware thread is dispatchable, and
   wherein each of the first and second hardware threads is a real-time thread and each of the third and fourth hardware threads is a non-real-time thread.

2. The multi-thread processor according to claim 1, wherein when a selecting ratio of the first group and the second group is N:M (N, M:integer number), a selected ratio of the first hardware thread, the second hardware thread and one of the third and fourth hardware thread is N:N:M.

3. The multi-thread processor according to claim 1, the scheduler further comprising:
   a first scheduler configured to switch scheduling between the first group and the second group;
   a second scheduler configured to schedule the second group; and
   a thread state management unit configured to monitor whether the each hardware thread is dispatchable or nondispatchable,
   wherein, when the first hardware thread is selected by the first scheduler and the thread state management unit indicates the first hardware thread is nondispatchable, the first scheduler switches scheduling the first group to the second group, and the second scheduler schedules the second group instead of the first hardware thread.

4. A scheduling method of a multi-processor having a plurality of hardware threads, said method comprising:
   performing a thread scheduling by:
      dividing the plurality of hardware threads to a first group having first and second hardware threads and a second group having third and fourth hardware threads;
      selecting each of the first and second hardware threads a predetermined number of times; and
      selecting one of the third and fourth hardware threads a predetermined number of times,
   wherein when the first hardware thread is selected and the first hardware thread is nondispatchable, a rescheduling is performed so that one of the third and fourth hardware threads is selected instead of the first hardware thread even though the second hardware thread is dispatchable, and
   wherein each of the first and second hardware threads is a real-time thread and each of the third and fourth hardware threads is a non-real-time thread.

5. The scheduling method according to claim 4, wherein when a selecting ratio of the first group and the second group is N:M (N, M:integer number), a selected ratio of the first hardware thread, the second hardware thread and one of the third and fourth hardware thread is N:N:M.

6. The scheduling method according to claim 4, wherein, when the first hardware thread is selected and the first hardware thread is nondispatchable, a rescheduling is performed to switch scheduling the first group to the second group so that the real-time thread is selected instead of the first hardware thread.

* * * * *